(12) United States Patent
Pietrowicz et al.

(10) Patent No.: US 9,110,101 B2
(45) Date of Patent: Aug. 18, 2015

(54) METHOD AND SYSTEM FOR PACKET ACQUISITION, ANALYSIS AND INTRUSION DETECTION IN FIELD AREA NETWORKS

(71) Applicant: TT GOVERNMENT SOLUTIONS, INC., Piscataway, NJ (US)

(72) Inventors: Stanley Pietrowicz, Freehold, NJ (US); Jason Youzwak, Somerset, NJ (US); John Haluska, Aberdeen, NJ (US)

(73) Assignee: Vencore Labs, Inc., Basking Ridge, NJ (US)

(*) Notice: Subject to any disclaimer, the term of this patent is extended or adjusted under 35 U.S.C. 154(b) by 140 days.

(21) Appl. No.: 13/769,133

(22) Filed: Feb. 15, 2013

(65) Prior Publication Data

US 2013/0227689 A1    Aug. 29, 2013

Related U.S. Application Data

(60) Provisional application No. 61/600,222, filed on Feb. 17, 2012, provisional application No. 61/613,663, filed on Mar. 21, 2012, provisional application No. 61/756,336, filed on Jan. 24, 2013.

(51) Int. Cl.
*H04L 29/06* (2006.01)
*G01R 1/20* (2006.01)
*G01R 21/00* (2006.01)
*G01R 22/06* (2006.01)

(52) U.S. Cl.
CPC ........ *G01R 1/20* (2013.01); *G01R 21/00* (2013.01); *G01R 22/063* (2013.01); *H04L 63/1408* (2013.01)

(58) Field of Classification Search
CPC ................ H04L 63/1408; H04L 63/104

USPC .................................................. 726/23
See application file for complete search history.

(56) References Cited

U.S. PATENT DOCUMENTS

| | | |
|---|---|---|
| 6,324,656 B1 | 11/2001 | Gleichauf et al. |
| 6,906,709 B1 | 6/2005 | Larkin et al. |
| 6,958,977 B1 | 10/2005 | Mitrani et al. |
| 7,174,566 B2 | 2/2007 | Yadav |
| 7,274,305 B1 | 9/2007 | Luttrell |
| 7,587,762 B2 | 9/2009 | Singhal et al. |
| 7,975,046 B2 | 7/2011 | Sheppard |

(Continued)

OTHER PUBLICATIONS

"Cisco Connected Grid Security for Field Area Network". Cisco White Paper. Published Jan. 2012. pp. 1-6.*

(Continued)

*Primary Examiner* — Jason K Gee
(74) *Attorney, Agent, or Firm* — Heslin Rothenberg Farley & Mesiti P.C.

(57) ABSTRACT

A system for intrusion detection in a field area network where data is transmitted via packets, includes a processor for analyzing the packets to ascertain whether the packets conform to a sets of rules indicating an intrusion, and a database for storing an alert indicating an intrusion if the packets conform to at least one rule in the sets. The sets of rules are for field network layer data, internet protocol traffic data and field area application traffic data. A method for detecting intrusion in a field area network where data is transmitted via packets, including analyzing the packets to ascertain whether the packets conform to the sets of rules, and storing an alert indicating an intrusion if the packets conform to at least one rule in the sets of rules.

38 Claims, 28 Drawing Sheets

(56) References Cited

U.S. PATENT DOCUMENTS

| | | |
|---|---|---|
| 8,325,057 B2 | 12/2012 | Salter |
| 2001/0039579 A1* | 11/2001 | Trcka et al. ............... 709/224 |
| 2002/0161536 A1 | 10/2002 | Suh et al. |
| 2005/0182950 A1* | 8/2005 | Son et al. .................. 713/189 |
| 2005/0289010 A1 | 12/2005 | Whittington et al. |
| 2006/0123477 A1 | 6/2006 | Raghavan et al. |
| 2009/0116404 A1 | 5/2009 | Mahop et al. |
| 2009/0138971 A1 | 5/2009 | Butti |
| 2010/0138066 A1 | 6/2010 | Kong |
| 2010/0217549 A1 | 8/2010 | Galvin et al. |
| 2011/0035510 A1 | 2/2011 | Alexander |
| 2011/0082599 A1 | 4/2011 | Shinde et al. |
| 2011/0103238 A1* | 5/2011 | Monk et al. ............... 370/252 |
| 2011/0248857 A1 | 10/2011 | Rutherford et al. |

OTHER PUBLICATIONS

International Search Report and Written Opinion dated Apr. 24, 2013 from corresponding International Patent Application No. PCT/US2013/026497, 16 pages.

International Search Report and Written Opinion dated May 3, 2013 from corresponding International Patent Application No. PCT/US2013/026504, 15 pages.

International Search Report and Written Opinion, International Application No. PCT/US2014/012970, mailing date May 19, 2014, 9-pages.

* cited by examiner

MeshView Filters and Statistics

| Set Filters | Timeline | Sources | Destinations | Reports | Earth | Manage Filters |

Time from 0.0 to 1000.0  
Hops min 0 max 30  
Device Type  
source: BC(Broadcast), UK(Unknown), MT(Meter), AP(AP)  
destination: BC(Broadcast), UK(Unknown), MT(Meter), AP(AP)

Packets in selection: 37 of 440  
Devices in selection: 140 of 1004  
Sources in selection: 1 of 19  
Destinations in selection: 37 of 422  
Hop count in selection: 4min/13max/9.86avg  
Hop count in all: 2min/16max/9.24avg  
Frequency uniformity: $X^2$:8.16, p:0.02

[change filter] [cancel changes] [clear filter]

Devices source:
* AP(AP)9c13:50:1f:62:8c:co:c3(id3)
MT(Meter)9c:13:50:01:9d:de:6b:7a(id284)
MT(Meter)9c:13:50:01:9d:de:b6:7a(id316)
MT(Meter)9c:13:50:01:9d:de:bf:12(id318)
MT(Meter)9c:13:50:01:9d:dc:17:54(id319)
MT(Meter)9c:13:50:01:9d:dc:7:4f(id322)
MT(Meter)9c:13:50:01:9d:d4:6f:2c(id324)
MT(Meter)9c:13:50:01:9d:de:6b:49(id326)
MT(Meter)9c:13:50:01:9d:d4:86:f2(id328)
MT(Meter)9c:13:50:01:9d:df:b5:59(id330)
MT(Meter)9c:13:50:01:9d:df:b5:59(id346)
MT(Meter)9c:13:50:01:9d:dc:d9:5f(id349)
MT(Meter)9c:13:50:01:9d:dc:3:4d(id351)

destination:
* BC(Broadcast)ff:ff:ff:ff:ff:ff(id1)
AP(AP)9c:13:50:ff:62:8c:cc:c3(id3)
*MT(Meter)9c:13:50:01:9d:d4:92:88(id13)
*MT(Meter)9c:13:50:01:9d:dc:fb:e8(id17)
MT(Meter)9c:13:50:01:9d:dc:37:94(id18)
*MT(Meter)9c:13:50:01:9d:df:1a:51(id19)
*MT(Meter)9c:13:50:01:9d:df:a6:8a(id26)
*MT(Meter)9c:13:50:01:9d:dc:ff:92(id29)
*MT(Meter)9c:13:50:01:9d:dc:1f:91(id33)
*MT(Meter)9c:13:50:01:9d:d7:77:37(id44)
*MT(Meter)9c:13:50:01:9d:d4:8e:14(id51)
MT(Meter)9c:13:50:01:9d:dc:2e:6(id53)

packet types
ADVREG(Routing AP Route Advertisement)
ADVBCS(Routing Beacon/Broadcast: AP Route Advertisement)
REQDEF(Routing Network Registration Request)
REQCFG(Routing Network Registration Request w/Config)

probes
*Probe 1

Packets
*packet1start544.203125frame19channel19typeRSPCRFend544.203125
*packet2start568.453125frame30channel43typeRSPCRFend568.453125
*packet3start585.046865frame42channel43typeRSPCRFend585.046865
*packet4start680.312500frame68channel19typeRSPCRFend680.312500

*FIG. 25*

METHOD AND SYSTEM FOR PACKET ACQUISITION, ANALYSIS AND INTRUSION DETECTION IN FIELD AREA NETWORKS

CROSS-REFERENCED APPLICATIONS

This application claims priority from U.S. provisional patent applications, Ser. No. 61/600,222, filed on Feb. 17, 2012, Ser. No. 61/613,663, filed on Mar. 21, 2012 and Ser. No. 61/756,336, filed on Jan. 24, 2013. All of these applications are incorporated herein by reference, in their entireties, for all purposes.

BACKGROUND

1. Field of the Disclosure

The present disclosure relates to data and control networks associated with a smart grid for electrical power distribution. More particularly, it relates to a system for intercepting, decoding, and analyzing field area network (FAN) communications used by smart meters and distribution automation equipment to independently provide intrusion detection and network monitoring for a FAN.

2. Description of the Related Art

Conventional systems for the generation, transmission, and distribution of electricity are well known. A power plant, or other source, generates electricity. The voltage is stepped up for distribution over high voltage transmission lines. The transmission lines are connected to substations, which step the voltage down to some intermediate voltage level. The power at this intermediate voltage level is distributed and further stepped down to a voltage that is delivered to homes and businesses.

Smart Grid is the modernization of the national electrical system to improve efficiency, integrate renewable generation sources, promote conservation, and better measure and manage the generation, transmission, distribution, consumption and potentially the storage of electricity. Much of the new technology in Smart Grid is focused on the electrical distribution network.

Key enablers for Smart Grid technology are intelligent embedded systems and communications in FANs. Intelligent embedded systems are small computer systems incorporated into power components that add sensor, control and monitoring capabilities. FANs enable communications among embedded system controllers and backend applications for measurements and control of Smart Grid components in the operation of the electrical system.

The Advanced Metering Infrastructure (AMI) is considered to be the leading edge of Smart Grid. AMI was the first large scale deployment of Smart Grid technology and involves deploying Smart Meters at every home and Communication Access Nodes or Access Points to support wireless communications among Smart Meters and backend applications. A Smart Meters is essentially a solid state computing and metering device with a network interface card. Smart Meter energy applications include remote meter reading, remote disconnect/connect, outage management, demand response, such as time of use pricing and direct load control, and customer engagement through home area networks (HANs).

Additionally, Smart Grid adds intelligent controls and sensors to distribution transformers, distribution feeders, and distribution substations to monitor asset state and condition, energy flow and to remotely control active components, such as switches, circuit reclosers, and capacitor banks. This portion of Smart Grid is known as Distribution Automation (DA).

Wireless networking technology is a popular means to support Smart Grid FAN communications due to the distributed nature of Smart Meters and DA electrical assets. Because Smart Meters and DA electrical assets coexist in the same physical territory, they may use the same or similar wireless networking technology for FAN communications.

There are a number of challenges present in managing and securing wireless FANs, such as those used in AMI and DA networks. First, FANs are wide area, multi-vendor, heterogeneous networks that combine a variety of wireless and wired technologies. Second, FANs constitute the largest network a utility will deploy and own. An AMI FAN can contain millions of Smart Meters that need to be managed over low bandwidth channels. Third, FANs operate in an unprotected environment. Intelligent endpoints cannot be physically protected very easily and they are often vulnerable to physical and cyber-attacks. Fourth, significant amounts of AMI and DA wireless technology are proprietary radio systems, which transport a mix of proprietary and standards-based networking protocols, some of which have yet to be adequately vetted from a security perspective. Fifth, because field equipment hardware updates and replacements are prohibitively expensive and since software updates cannot remedy all security vulnerabilities, utilities that operate FANs will ultimately have to manage multiple vintages of hardware, each with a different vulnerability profile. Some security vulnerabilities are inherent in the hardware and wireless communication. They cannot be eliminated and means to detect their potential exploitation are needed as part of comprehensive security program. Sixth, many of the new FANs, particularly for AMI, are adhoc, self-forming networks that are more dynamic than traditional IP networks and less understood on a large scale, such as in a Smart Meter deployment. In addition, FAN wireless technology is still quite immature and improvements are constantly being made to communications security, network performance, and routing, for instance.

Given all these challenges, there is a great need for network management and security tools akin to those commonly employed in IP enterprise networks to provide visibility, situational awareness and security monitoring. However, at present, no commercial solutions are available to monitor wireless FAN traffic and detect security anomalies/intrusion, network performance issues or even software bugs. Furthermore, there are no independent monitoring capabilities to help mitigate supply chain cyber risks in FAN components. All information about FANs is currently sourced through the application management tools provided by the Smart Grid component vendor, which would be unreliable if the vendor's supply chain was compromised.

Much of Smart Grid technology is still in its infancy. AMI, DA and FAN system providers are presently consumed by getting their claimed functionality to work. Little to no attention has been given to implementing network monitoring and intrusion detection systems. In addition, because many FANs use proprietary radio systems and protocols, none of the solutions commonly used for IP networks will work. Furthermore, whereas the industry understands the vulnerabilities in IP networks from years of experience, it is still in the discovery period with respect to the vulnerabilities in wide-area FANs. Smart Grid FAN technology is new and no information is publically available on prior solutions. An analogy can be made, to a limited extent with network monitoring and intrusion detection in Wi-Fi networks. However, known commercial solutions intrusion detection in Wi-Fi networks do not operate via over-the-air captures. The geographic footprint of Wi-Fi networks is small in comparison to a Smart Meter network and Wi-Fi is built on a open, public standard.

SUMMARY

An objective of the present disclosure is to provide a method and system to intercept, decode, analyze and store the communications in FANs, abstract and present information about the network and communication flows in usable form, and implement distributed intrusion detection and network monitoring capabilities, all through means independent of a Smart Grid vendor's products and supply chain.

The present disclosure is also directed to an interchangeable, probe-based method and system to intercept, decode, analyze, and store over-the-air and headend communications in FANs and implement distributed intrusion detection capabilities, all through means independent of a Smart Grid vendor's products and supply chain.

The disclosure is directed to an intrusion detection and network monitoring system in a field area network where packet streams from a multitude of field and headend probes are inspected and the behavior of nodes is modeled. The system includes one or more intrusion detection functions for analyzing the packets and communication flows to ascertain whether they conform to a set of rules and behaviors indicating an anomaly or sign of intrusion; and a database portion for storing an alert indicating an anomaly, intrusion, or unexpected node if the packets or flow conform to at least one rule in the set of rules.

The intrusion detection function can be configured to analyze the physical, Media Access Control (MAC) and layers between link and network portions of the protocol stack that support formation and maintenance of mesh networks. The intrusion detection function determines whether this content satisfies a first set of rules, and stores in the database an alert indicative of the physical and low layer data satisfying at least one rule of the first set of rules. Typically, the physical and low layers are proprietary in nature and require reverse engineering to understand their content.

The intrusion detection function can be configured to analyze the packets to determine whether Internet Protocol data is present in the packets and whether the Internet Protocol data satisfies a second set of rules, and to store in the database an alert indicative of the Internet Protocol data satisfying at least one rule of the second set of rules. The Internet Protocol data can be IPv4 or IPv6 packets.

The intrusion detection function can be configured to analyze the packets to determine whether field area network application data is present in the packets and whether the field area network application data satisfies a third set of rules, and to store in the database an alert indicative of the field area network application data satisfying at least one rule of the third set of rules.

The intrusion detection function can be distributed or centralized. It can be located in a field probe installed in the FAN, in a probe placed in the headend of a field area network or in computing platforms within the data, network operations center, or security operations center of a field area network, where traffic from the field and headend probes is routed for analysis and storage.

The FAN intrusion detection and monitoring system also includes a repository for storing the traffic intercepted by the probes for recall, replay, post-analysis and forensics at a later time.

The FAN intrusion detection and monitoring system also includes a client service portal that provides electronic access for system users to access a set of monitoring, analysis, and visualization applications. The applications allow users to monitor the health and operation of the system and probes, view the intrusion detection alerts generated by the system, view, decode, analyze and filter real-time and stored packet traces, and analyze and visualize the FAN topology and communication flows. The system can also provide an electronic feed of alerts from the intrusion detection system to the client's security systems to deliver real-time alerts.

The rules are securely stored in database including a set of keys for accessing the rules. The set of keys is retrieved based on at least one of MAC and IP addresses of a sender and receiver pair in the field area network.

The disclosure is also directed to a method for detecting intrusion in a field area network where data is transmitted via packets, including analyzing packets to ascertain whether the packets conform to a set of rules or behaviors; and storing in a database an alert indicating an intrusion if the packets conform to at least one rule or behavior.

The method can further include analyzing the physical, Media Access Control (MAC) and layers between link and network portions of the protocol stack that support the formation and maintenance of mesh networks to decide if any of a first set of rules is satisfied, and storing in the database an alert indicative of the physical and low layer data satisfying at least one rule of the first set of rules.

The method can further include analyzing the packets to determine whether Internet Protocol data is present in the packets and whether the Internet Protocol data satisfies a second set of rules, and storing in the database an alert indicative of the Internet Protocol data satisfying the second set of rules. The Internet Protocol data can be IPv4 or IPv6 packets.

The method can further include analyzing the packets to determine whether field area network application data is present in the packets and whether the field area network application data satisfies a third set of rules, and storing in the database an alert indicative of the field area network application data satisfying at least one rule of the third set of rules.

The packets can be received from a probe located in a FAN or a probe in the headend of a field area network. Other information relevant for intrusion detection, such as node events can be received from an operations center of a field area network associated with a power distribution system or management system.

The disclosure is also directed to a method for storing and retrieving traffic traces intercepted by the probes.

The disclosure is also directed to a method for providing a system user access to a set of applications through a client service portal to support a hosted or managed service implementation of the invention.

The disclosure is also directed to a method to monitor the health and operation of the system and probes, view the intrusion detection alerts generated by the system, view, decode, analyze and filter real-time and stored packet traces, and analyze and visualize network topology and communication flows.

The disclosure is also directed to a computer readable non-transitory storage medium storing instructions of a computer program, which when executed by a computer system, results in performance of steps of a method for detecting intrusion in a field area network where data is transmitted via packets. The steps include analyzing the packets to ascertain whether the packets conform to one or more sets of rules; and storing in a database an alert indicating an intrusion if the packets conform to at least one rule in one or more sets of rules.

BRIEF DESCRIPTION OF THE DRAWINGS

FIG. 25 is screen shot example showing the packet filters and communications statistics based on filtered result in the MeshView application.

A component or a feature that is common to more than one drawing is indicated with the same reference number in each of the drawings. Reference numerals generally begin with the figure number of the figure in which the component or feature is first mentioned.

DESCRIPTION OF THE PREFERRED EMBODIMENTS

Figure 1A:
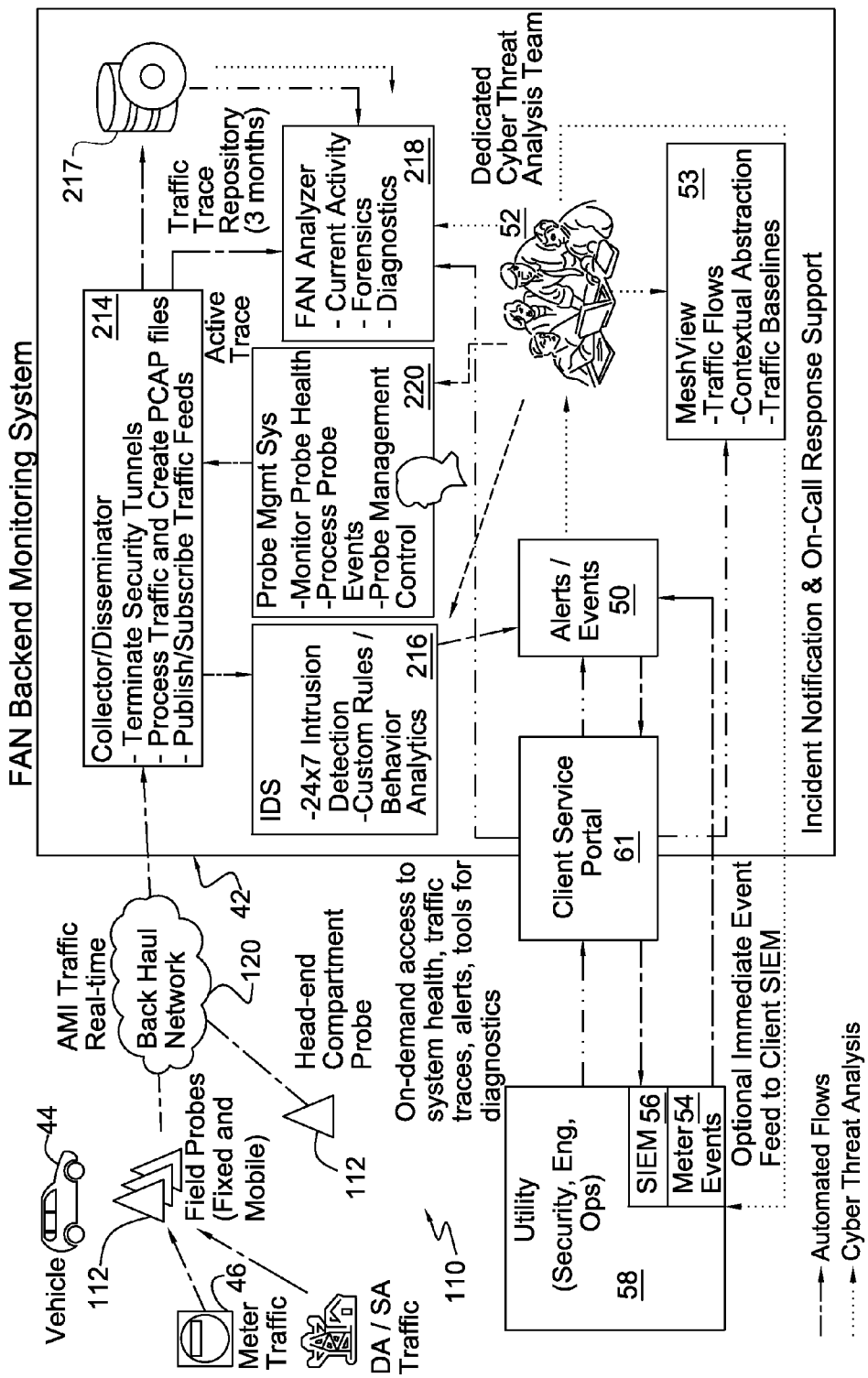
FIG. 1A is a high level block diagram of the FAN intrusion detection and monitoring system architecture.

FIG. 1A shows a high level block diagram of the FAN intrusion detection and monitoring system architecture. The FAN intrusion detection and monitoring system consists of two major subsystems, the field and headend probes and the FAN backend monitoring subsystem, shown generally as 42. The FAN intrusion detection and monitoring system can be installed and operated by a FAN owner such as a utility or provided as a hosted service, such as a managed security service, by another party. In the preferred implementation, the FAN intrusion detection and monitoring system is operated as a hosted managed security service that supports multiple FANs.

A multitude of probes 112 are inserted within the FAN 110 to intercept FAN traffic for backhaul and analysis by the FAN backend monitoring subsystem 42. Fixed external probes 112 can be located on any utility asset, such as poles, towers, substations and building or commercial and private residential structures given the permission of the property owner. Traffic from fixed probes is backhauled through commercial wireless networks (e.g., 3G or LTE) or existing utility tier 2 and 1 network facilities.

Fixed probes 112 can also be co-located or embedded into a subset of residential or commercial meters or HAN-enabled or load control devices within a Smart Grid home area network. HAN-enabled devices typically inform rate payers of energy usage, time of use charges or demand response actions. Meter and HAN device probes provide the advantage of convenient access to power, as well as a less harsh physical environment. In addition, commercial meters typically have data connectivity, which can be used by the probe. Although residential Smart Meters have AMI data connectivity, it is preferable to use a separate network for probe communications to maintain independence of probe communications from AMI communications for supply chain integrity and to avoid overloading bandwidth-limited AMI networks. Meter and HAN-based probes would generally use commercial wireless service for traffic backhaul, unless customers permitted use of their fixed broadband connections.

Mobile probes are installed in fleet vehicles 44 of utilities or on any vehicle that agrees to become a host for a mobile probe. In towns where municipalities own and operate their own electrical infrastructure, probes 112 may be placed in municipal vehicles, including garbage trucks, police cars, street sweepers and road maintenance vehicles. Mobile probes may also be placed in commercial vehicles, such as taxis and delivery trucks. The main requirement is the vehicle move within the utility service territory where the FAN 100 is located. A benefit of using utility and service trucks is that they are usually already equipped with wireless data connectivity and global positioning system tracking devices, which can be used by the mobile probes.

Mobile probes backhaul traffic via commercial wireless networks or store the traffic for later upload upon the vehicle returning to its storage point, at which time its traffic may be uploaded via local Wi-Fi service or manually using USB memory stick transfer, thereby eliminating the need for wide area network connectivity.

Headend probes 112 are placed within the FAN headend compartment to intercept all the traffic between the access points (described below) and the headend management system. Headend probe traffic is transmitted to the over any convenient network with sufficient bandwidth; typically a wired IP network.

The field probes 112 receive traffic from meters and receive DA/SA traffic. Real time AMI traffic from the probes 112 is sent to FAN backend monitoring subsystem 42 via a backhaul network 120 to a collector/disseminator 214. Data from collector/disseminator 214 is disseminated to an intrusion detection system IDS 216, a FAN analyzer 218, and a traffic trace repository 217 (FIG. 14), which stores the traffic for a period of generally three months. A probe management system 220 communicates with collector/disseminator 214. IDS 216 logs alerts and events at 50. Such Alerts and events are also received from a client service portal or user portal 61 and forwarded to a dedicated cyber threat analysis team, shown at 52, who analyze threats and provide input to the FAN analyzer 218. Input from cyber threat analysis team 52 and from the client service portal or user portal 61 is also forwarded to the MeshView application 53 described below, as well as to a meter events portion 54 of a security information and event management (SIEM) application 56 within a utility 58 that includes security, engineering and operations functions, These components, and their functions, are described below.

Figure 1B:
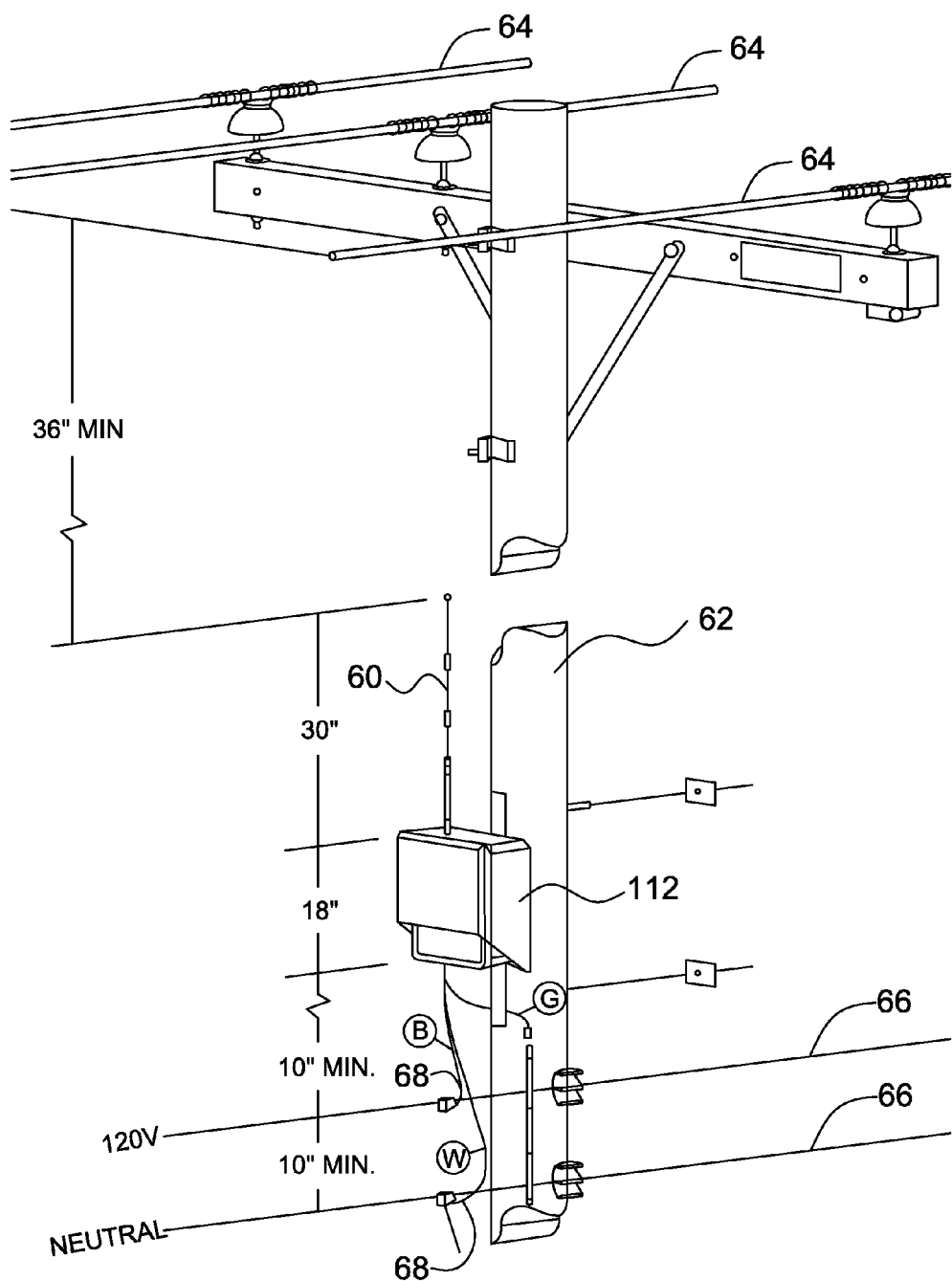
FIG. 1B illustrates a typical installation of a probe in a tiered utility network infrastructure, on a utility pole.

FIG. 1B illustrates a typical installation of a probe having an antenna 60 for transmitting traffic, as mounted on a utility pole carrying wires 64 for a distribution voltage, and wires for the typical 120 volts provided to customers. Wires 68, connected to wires 66, provide power for the operation of probe 112.

Figure 1C:
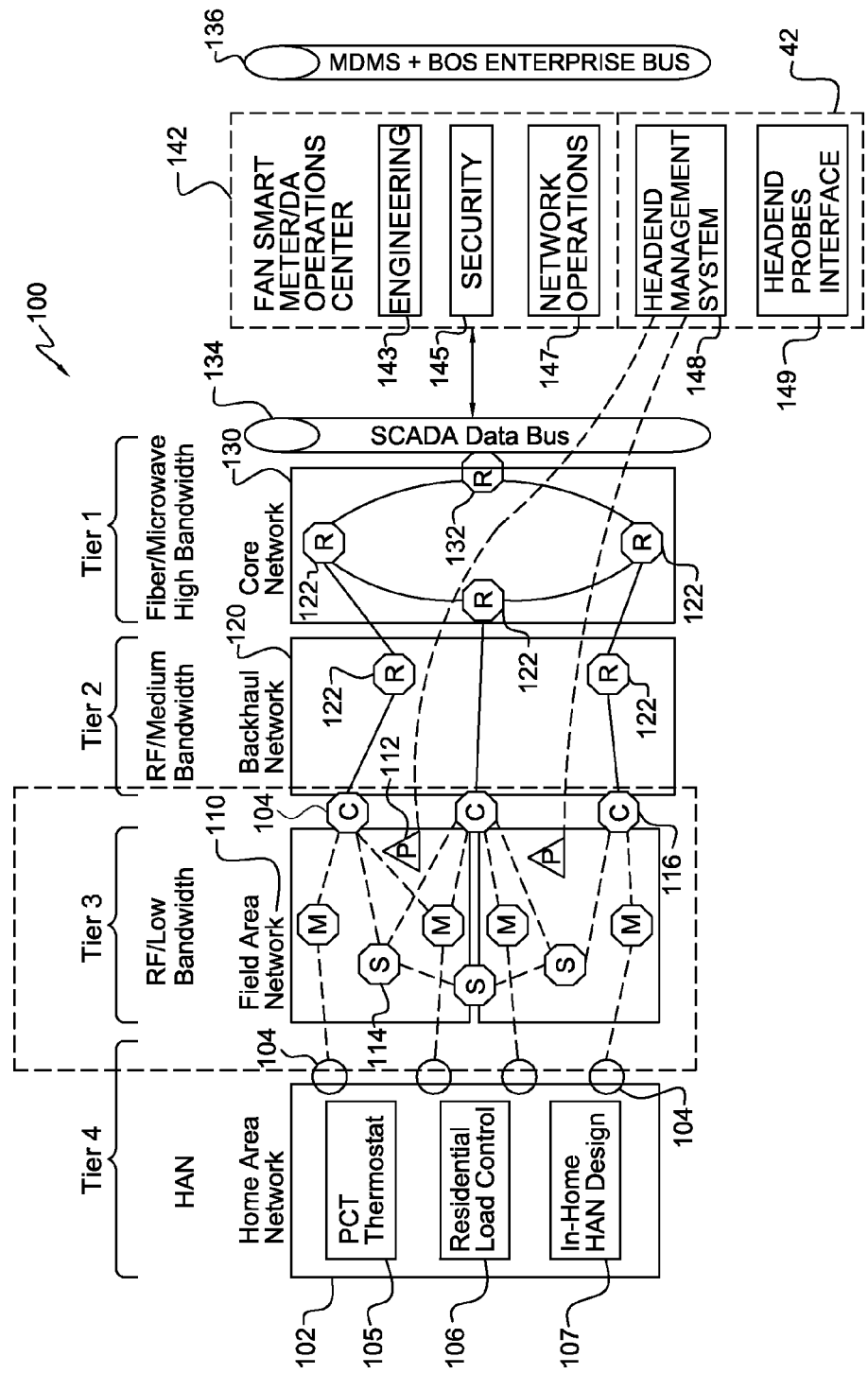
FIG. 1C shows how the FAN IDS system can overlay on a utility network infrastructure.

FIG. 1C shows how the probes and FAN backend monitoring system overlay on a typical tiered utility network infrastructure. At the lowest level, a home area network (HAN) 102 for a home or building has associated with it one or more advanced or smart meters 104 and HAN-enabled devices, such as at least one programmable communicating thermostat (PCT) 105, at least one residential load control device 106 and an in house. The smart meters and DA devices communicate via a FAN 110 that transports meter, HAN and distribution automation traffic by low bandwidth RF communication among meters 104, access points 116, relays 117, and sensors and distribution automation controls 114. Access points 116 act as gateways that transition FAN traffic to Wide Area Network (WAN) traffic for backhaul to the headend system for utility applications. The WAN may consist of commercial wireless networks that connect the access points to the utility backend infrastructure or a combination of tier 2 local networks 120 at substations that in turn connect to the utility backend via a core tier 1 network 130 compromised of fiber or microwave systems.

Data from FAN 110 is communicated by generally medium bandwidth RF communication to backhaul network 120. Backhaul network 120 can include a series of routers 122 to facilitate moving data to a core network 130 which may use fiber optics or microwave communication. A router 132 routes data to a supervisory control and data acquisition (SCADA) equipment 134. The traffic is then sent to a FAN smart meter/DA operations center 142 including engineering 143, security 145 and network operations 147, Probe data is transmitted to FAN backend monitoring subsystem 42, which includes a headend management system 148 and a headend probes interface 149. Data is available on a model driven monitoring system (MDMS) data bus 152.

As previously mentioned, probes are inserted in various locations within the FAN, HAN and headend system compartment. Probe traffic is backhauled over commercial wireless networks, tier 2 and 1 utility networks and potentially customer broadband access to the FAN backend monitoring subsystem. The FAN backend monitoring subsystem can be located in the utility data, network operations or security operations center, existing in or near the headend management compartment or at another party's site, such as in a hosted solution.

Fixed probes are inserted into the FAN using a variety of deployment strategies. One strategy is to deploy probes in areas of high meter density. A second strategy is deploy probes in areas where crime rates are high or where energy theft and equipment tampering has occurred historically. A third strategy is to deploy probes in areas where there is distribution automation equipment to be able to monitor over-the-air DA and AMI communications near sensitive equipment. A fourth strategy is to deploy probes near sensitive commercial and government facilities, such as industrial centers, critical infrastructure, government offices and military bases. A fifth strategy is to deploy probes at the intersection of multiple access point coverage zones so as to cover the traffic for three or four access points with a single probe given sufficient line of sight range. The probes are designed with RF front-ends superior to the Access Points and can reach greater distances. Finally, a sixth strategy is deploy probes so that one is co-located with every access point.

Fixed probes do not need to be deployed to provide full geographic coverage of the FAN. Mobile probes are used as a means to sample traffic from all over the service territory, making use of fleet vehicles owned by the utility or another party, such as municipal vehicles, taxis or delivery trucks that agree to install probes.

Figure 2:
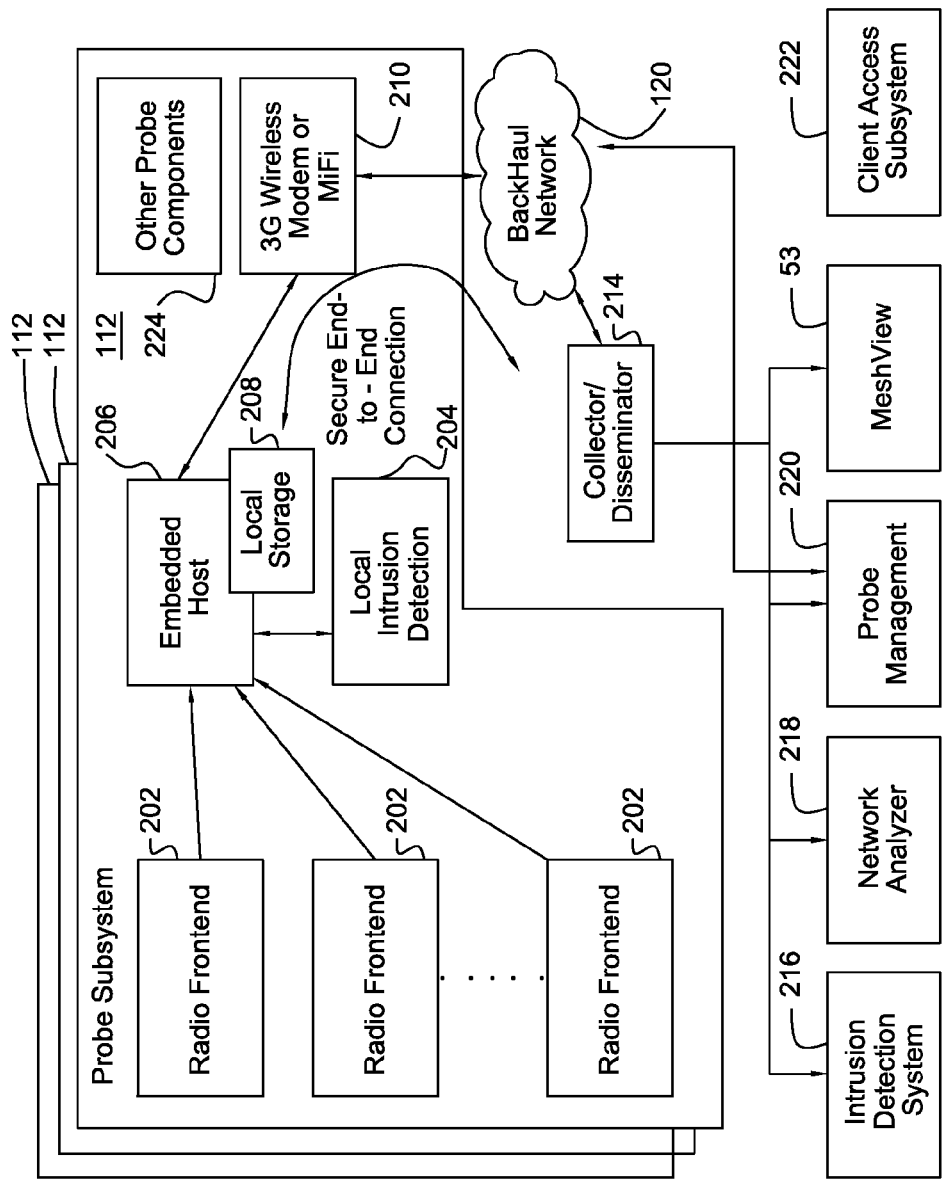
FIG. 2 is a high level block diagram of the FAN intrusion detection and monitoring system architecture 1.

FIG. 2 illustrates the system architecture with greater probe detail. A multitude of probes 112 is deployed in the distribution network of a utility. A controller or embedded host 206 controls a commercial wireless modem 210 via a serial or bus interface, establishes the secure session and streams packets and/or transmits events. Alternatively, to avoid custom driver development, the embedded host 206, which is preferably an embedded Linux system, communicates to the wireless modem or Mi-Fi device 210 via a standard Wi-Fi connection that provides 3G or LTE connectivity.

FIG. 2 illustrates other components including communication of data from the wireless modem or Mi-Fi device 210 via the Internet or private network 212 to a collector/disseminator 214. Data is communicated form the collector/disseminator 214 to the IDS 216 network analyzer 218 and other backend systems described below. The probe management system 220 sends control information to the probes via the Internet or private network 212 and wireless modem or Mi-Fi device 210 to embedded host 206.

Other components of probes 112 include a local storage 208 and an optional local intrusion detection function 204. A client access subsystem is represented at 222. Other probe components, as represented at 224, are described in more detail with respect to FIG. 6.

The probes implement radio front end technology 202 to access the radio signals being transmitted in the FAN. Typically, these signals are transmitted using Frequency Hopping Spread Spectrum techniques over a multitude of channels in the 900 MHz ISM band for AMI networks. U.S. Pat. No. 5,079,768 describes the operation of a frequency hopping communications network using a pseudo-random pattern of frequency changes, the use of communications slots arranged into epochs, methods to determine the channel of the receiver and whether a node should transmit or wait for a later slot.

The probes support multiple channel capture through a combination of independent RF frontends, channel scanning techniques, and/or digital signal processing techniques that permit capture of a wide band containing multiple channels and real-time demodulation of each channel. In the preferred implementation, the probe will sample FAN traffic by selecting several frequencies to monitor such that a chosen percentage of traffic is captured. For instance, in an 80 channel system where FAN traffic is equally dispersed among all 80 channels, a selection of 8 channels would provide a 10% sample of FAN traffic using a technique where the probe remains stationary on a set of channels. Alternatively, each RF frontend 202 in a probe can scan through a chosen set of channels, with each frontend 202 covering a portion of the total bandwidth, and then lock onto a channel when a portion of the preamble sequence that precedes each message transmission is detected. In yet another implementation, the entire 80 channels are intercepted using a full spectrum probe. In a typical probe, there will be multiple RF frontends 202 and some can be set to a fixed set of channels and others can be configured to scan channels. In a more sophisticated probe implementation, the entire ISM band is captured and digital signal processing techniques are used to demodulate most or all channels simultaneously for full traffic capture. Yet another possible mode of operation is for a probe to target all transmission associated with a specific AMI device, such as an access point 116 or a specific meter 104. This requires implementation of the corresponding frequency hopping algorithm and may require input from live traffic to derive the appropriate timing to achieve this. Under typical conditions, traffic sampling is sufficient to monitor for signs of intrusion as attackers will not know which channels are being monitored. Attackers may attempt to transmit on multiple channels simultaneously or remain fixed to a single channel when attempting to compromise a particular node. In either case, their behavior is detectable as anomalous activity.

Probes 112 are intended to be interchangeable and configurable devices that can accommodate different wireless technologies, RF frequency ranges, and performance requirements. Some aspects of the probe, such as the number and type of RF front-ends will be determined at the time of manufacture because they are hardware dependent. Other aspects of the probe, such as but not limited to the channels to monitor, the traffic sampling method, the demodulation method (especially in DSP-based probes), type of local intrusion detection logic, mode of backhauling traffic (e.g., continuous streaming or trigger-based), and packet decoding logic can be remotely configured by the probe management system 220.

Some probes 112 may also contain a local intrusion detection function 204, whereby the probe decodes and optionally descrambles all or portions of intercepted packets and applies security rules, policies and heuristics that are within processing power of an embedded host 206 to detect anomalies and signs of intrusion. The local IDS functionality can be applied to one or more received channels within a probe under the control of the probe management system 220.

Aside from considerations for probe configuration and processing capacity, a decision to incorporate local IDS functionality could be influenced by the location and physical security of the probe. A reason to leave all IDS processing in the backend is to protect the knowledge of how to descramble and decode the intercepted traffic. If this processing is performed within the probe, the knowledge may be vulnerable if an attacker can steal and successfully reverse engineer a probe. If the descrambling and decoding processes are located in the FAN backend monitoring subsystem, the probes merely act as a collector of public, over-the-air traffic and would generally pose no additional security risks beyond those already present in the equipment being monitored. In physically secure locations, such as secure substations and probes mounted high atop towers and poles, local IDS functionality may be deployed at low risk of attack. In locations where probes cannot be physically protected, basic traffic collector probes with less decoding and intrusion detection functionality may be desirable.

Probes 112 can operate in both receive and transmit modes. Normally, probes 112 operate in a passive, promiscuous, receive mode to monitor traffic. However, a probe 112 can also be instructed to transmit a particular message on a particular channel to a particular destination by backend management applications or the probe management subsystem. This capability can be used for test and diagnostic purposes or as part of a response to an identified attack to delay, interfere with, or deny success to an attacker.

Probe 112 can be configured to either stream back all traffic received without processing or locally capture a time slice of the traffic in a circular buffer. In streaming mode, all traffic is passed to backend applications for processing and storage. In the preferred implementation, timestamps, sequence numbers, probe identifying information, and global positioning system coordinates are applied by the probe upon receipt of each packet. Alternatively, timestamps can be applied at the backend. In trigger mode, the probe continually buffers a time slice of traffic in local storage 208, and once a trigger condition is satisfied, the probe generates an event back to the probe management subsystem and stores or immediately uploads the time slice of traffic to the backend monitoring subsystem. The time slice is preconfigured for duration and includes traffic that generated the trigger event. Upon receiving an event, the probe management subsystem can retrieve the stored time slice for evaluation if not already uploaded and reconfigure probe 112 for additional captures in streaming or trigger modes. Trigger mode is beneficial to reduce backhaul traffic volume and cost of transport when backhaul transport is metered.

Various triggers and filters can be used to raise an event and filter traffic collected or streamed by the probe. Some of these triggers include:
Source and/or Destination Address
Start Word
Channel ID
Time of Day
Type of Traffic (e.g., unicast, broadcast, commands, responses, synchronization, or network maintenance)
Virtual Network ID.

In one mode, probe 112 can be instructed to track a particular target node, such as a Smart Meter 104 or Access Point. This mode is particularly useful for monitoring a high value target to an attacker, such as an Access Point, because Access Points represent the passage point between the FAN and utility backend systems. Attackers attempting to penetrate backend systems from the FAN will likely target Access Points. Monitoring all traffic sent to an Access Point could aid in the detection of attacks aimed at penetrating the headend system.

Tracking a node means hopping in synchronization in both frequency and time with the pseudorandom sequence chosen by a target node in frequency hopping systems. In many AMI and DA systems, for instance, each node uses a different pseudorandom hopping sequence, typically based on its MAC address. A probe in tracking mode listens for a synchronization broadcast packet from the target node. The synchronization broadcast contains timing information (e.g., a fractional epoch tick) about where the target node is currently in its hopping sequence referenced to the time the packet was received. With knowledge of a global channel array, the MAC address of the node to be tracked, the frequency hopping slot time, and position of the target node in its hopping sequence at a reference point in time, the probe can calculate the next channel where the node will be listening at future times and change its channel frequency to match that of the target node. An example pseudorandom hopping sequence is described in United States Patent Application No. 2009/0168846, which is incorporated herein by reference in its entirety by reference thereto. To maintain hopping synchronization with the target node, given clock drift and situations where the target node restarts it hopping sequence, the probe updates its timing information with every synchronization broadcast packet the probe receives from the target node. To improve reception of synchronization broadcast packets, especially in cases where synchronization is lost, the probe can be configured with one RF frontend 202 tracking the target node on the calculated channel and one or more other RF frontends 202 listing or scanning other channels in the system for target node's synchronization broadcasts.

Probe traffic can be backhauled through a variety of wide area networks, both wired and wireless. In the preferred implementation, probe traffic is backhauled via 3G or LTE commercial wireless networks. Traffic received via each hardware front end or logical RF channel (in the case of a digital signal processing (DSP) probe implementation) is aggregated by the embedded controller. Timestamps, sequence numbers, global positioning system coordinates and other information related to the capture are layered on each captured packet. The embedded controller maintains one or more secure communications channels with backend applications for securely transferring captured traffic and management control. The preferred methods to secure these channels are IP-based Transport Layer Security (TLS)/SSL, IPsec VPN, Layer 2 Tunneling Protocols with IPsec or Point-to-Point Tunneling, and Secure Shell Tunneling. Standard compression algorithms can be applied to the packet stream to reduce backhaul bandwidth. The backend collector/disseminator decompresses and decrypts the packet stream to make it available to the IDS and other backend system components.

In FIG. 2, FAN traffic from a multiple of field and headend probes is sent to the data processor or collector/disseminator 214 over one or more types of backhaul networks, typically IP networks. Each probe traffic stream is sent via TCP/IP or UDP through a tunnel to a different IP port on the collector/disseminator. The collector/disseminator 214 serves as an endpoint in the security association with each probe and terminates the security tunnel that protects the probe traffic while in transit over the backhaul network. The collector disseminator decrypts and decompresses each probe traffic stream. If not already performed by the probes 112, the collector/disseminator processes the probe packet streams to descramble the bits. The bit descrambling algorithm is system dependent. An example of a bit scrambling/descrambling method for FANs is described in United States Patent Application No. 2009/0303972, which is incorporated herein in its entirety by reference thereto. The collector/disseminator 214 extracts GPS data from the packet probes to create a mobile probe route file, adds system metadata about the probe traffic stream and creates packet trace files in PCAP format. The collector/disseminator 214 operates in a publish and subscribe mode, making available traffic streams to all those application in the backend that subscribe to a particular stream. The collector/disseminator publishes the processed live traffic feeds, for example, to the IDS, network analyzer, traffic repository and MeshView applications described below.

The processed live traffic feeds are sent to an IDS system for real time analysis. In the preferred implementation, the IDS is a modified version of Snort, an open source network-based intrusion detection system (NIDS) that has the ability to perform real-time traffic analysis and packet logging on Internet Protocol (IP) networks. The IDS operates 24×7 on incoming packet streams. IDS' such as Snort inherently process IPv4/IPv6 traffic, but they do not work with proprietary protocols commonly used in Smart Grid FANs. As such, special preprocessors are constructed to look at the physical frame, media access control, link layers, custom layers between the link and network layers, and multiple embedded levels of application layer protocol and data in FAN packets. IPv4/IPv6 protocol data units that are embedded in a FAN data packet are analyzed by the IDS IPv4/IPv6 capabilities once extracted using custom rules. In addition, preprocessors are used to analyze other proprietary protocols that are used exclusively in the FAN, such as proprietary routing protocols, broadcasts, node synchronization/maintenance, secure associations, and transaction handshake messages. Application protocols typical consist of a mix of standards-based protocols, such as C12.22 and proprietary protocols. United States Patent Publication No, 2008/0051036 provides an example of the mesh layer protocols used in AMI, i.e., the layers between the link and network layers that are required for mesh network operation.

Figure 4:
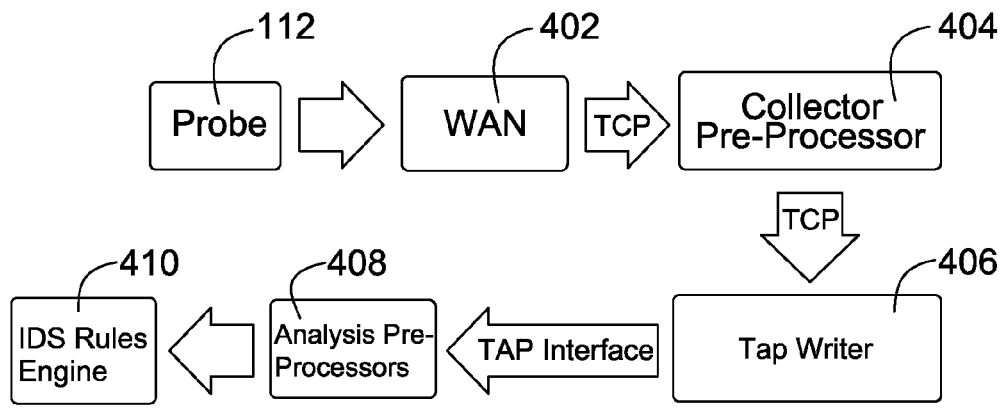
FIG. 4 illustrates an IDS packet flow architecture.

The end-to-end packet flow for the IDS is shown in FIG. 4. Streaming probe packet traffic is received and processed by the collector/disseminator and fed into the IDS through a network TAP interface using a TAP writer module. The TAP interface feeds the IDS preprocessors where a first set of rules and behavior analytics are applied. The IPv4/IPv6 and application layers are then processed by inherent IDS capabilities using a second set of rules and behavior analytics. Application layer protocols are then analyzed by a third set of rules and behavior analytics.

Each probe stream is processed by a separate IDS instance that is customized with specific rules for the probe source. For instance, the source and destination addresses contained in the intercepted traffic from each fixed probe are processed against a separate whitelist for each probe. Smart meters and DA equipment have fixed geographic locations and their traffic should appear one or more probes, but not in others. Address white lists are constructed to identify legitimate sources for each probe. Devices not on the whitelist are identified by the IDS instance for each probe, generate an alert and are subject to further scrutiny. In addition, a global IDS may be run on the composite of all probe traffic to detect aberrations that apply globally regardless of probe, such as monitoring for the authorized network ID in use by the FAN system.

The IDS runs 24×7 processing the continual stream of incoming probe traffic. Alerts are generated when anomalies and behavior satisfy the rule set and behavior analytics. The alerts are logged to an Alert/Events database. The Alerts/Events can also be electronically transmitted in real-time to security incident and event management systems operated by the utility over an electronic interface through the client service portal.

The client service portal provides utilities with secure access to the Probe Monitor (a subset of the Probe Manager capabilities used by the FAN intrusion detection and monitoring system), the Network Analyzer, the traffic repository, and the MeshView applications. The client service portal consists of web applications using Transport Layer Security and virtual private network connections. All applications accessed through the client service portal are hosted and run on platforms with the FAN backend monitoring subsystem.

Alerts/Events generated by the IDS are processed by a cyber threat analysis function, which is generally a team of individuals who are fluent with the operation of the FAN, the behavior patterns of the nodes and traffic profiles, and security weaknesses and vulnerabilities in the FAN technology and its protocols. The cyber threat analysis team reviews each alert in detail by retrieving the traffic trace from the trace repository that generated the alert. The cyber threat analysis team also sets the appropriate filters in MeshView to retrieve the communications and nodes of interest at the time of the alert. The cyber threat analysis team analyses the traffic patterns and node behavior before, during and after the event, and compares the behavior to known baselines. If the team validates an alert/event as a sign of intruder activity or network malfunction, it notifies the utility customer of the event and together they proceed to further investigate. The investigation may require mobile probes to be sent to the area and fixed probes to be reconfigured to focus on nodes or traffic of interest.

The live processed traffic feeds are also sent to one or more instances of the Network Analyzer ( ), which decodes the information fields in the incoming packets and presents a running list of packets where users can observe the real-time FAN traffic activity intercepted by each probe. Much like well known network analyzers, such as an application programming interface for capturing network traffic (PCAP), such as, for example, a PCAP processing tool, the FAN Analyzer permits users to select a packet for decoding. Powerful packet filters that use each information field at a filterable item can also be applied to present subsets of traffic that match the filter criteria.

The live processed traffic feeds are also sent to a traffic repository. Every probe traffic feed is captured and stored in the traffic repository for a minimum of 3 months. In the preferred implementation, packet capture are broken into files and stored on an hourly basis using a file naming convention and directory structure that permit quick identification of the traffic from each probe by day and time. The traffic files can be later recalled by the Network Analyzer or any of the other applications for reprocessing to support diagnostics or an investigation. They can also be reprocessed when new rules, analytics or decoding capabilities have been added. Traffic recall is important to need to support diagnostics and forensics work.

The live processed traffic feeds are also sent to the network analysis and visualization tool (MeshView) where communication flows and higher level network routing and connectivity maps are constructed from observations in the packet captures. The processed traffic feeds are further processed by MeshView to extract topology information and imported into the MeshView applications database. Traffic statistics and traffic base lining are performed by MeshView to develop profiles of traffic for each probe by time of day and day of year.

The intrusion detection and monitoring architecture presented in FIG. 2 can be simplified for standalone operation with a single laptop and single or small number of probe, similar to the way commercially available network analyzers operate with a WiFi network card on a laptop computer. Such configuration may be useful for lab applications as well as when incorporating analyzer and IDS capabilities into diagnostic tools for field technicians.

Figure 3:
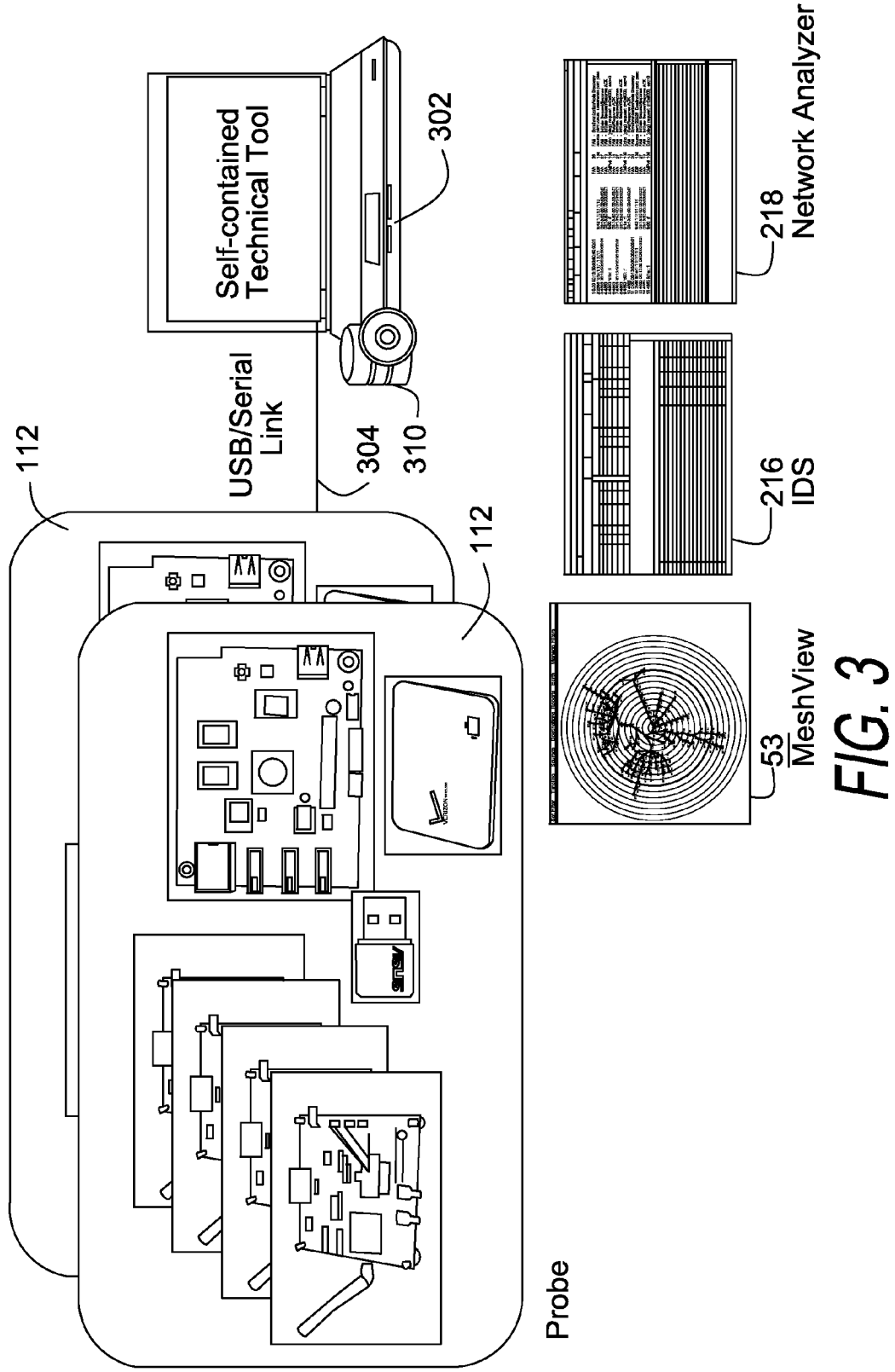
FIG. 3 is a high level block diagram of a stand-alone, probe-based intrusion detection and monitoring system architecture.

FIG. 3 illustrates a compact laboratory or field technician stand-alone diagnostics tool that implements the core functions of packet capture, storage, network analyzer, IDS functions, and network analysis and visualization for one or a small number of probes 112 on a laptop computing system 302. Instead of a wireless modem to backhaul traffic to the FAN backend monitoring subsystem, a USB or serial connection 304 to transport intercepted traffic between the probe(s) 112 and laptop computing system 302. The network analyzer, IDS and network analysis and visualization capabilities of MeshView 53 are implemented as a set of applications. A simplified version of the collector/disseminator is used to multicast packet streams. Traces are locally stored on the laptops hard disk 302 of the computing system 302. In another implementation, a control center is accessed by computing system 302, which need only have a thin client, such as for example, a browser. Data manipulation and processing is performed at the control center.

FIG. 4 illustrates packet flow to the IDS 216. Streaming packet traffic from a probe 112 is carried by a wide area network or WAN 402 and is fed from WAN 402 into a collector/preprocessor 404. A TAP writer interface 406 then feeds the data to an analysis pre-processor 408, which in turn feeds the data to a Snort module 410.

Data packets emitted by the probe convey the captured transmissions. Other information, including meta-data associated the captured packet, may be sent by the probe. Such information, sent with the captured transmissions or perhaps separately, includes:
 1. Timestamp identifying when the packet was captured
 2. Received Signal Strength Indication (RSSI)
 3. Identification of the specific radio headend device which captured the packet
 4. The frequency to which the radio headend was tuned, and thus on which the packet was captured. This could potentially differ from the frequency identified by any channel identifier present in the captured packet
 5. System-wide unique identification of the probe reporting the packet
 6. Parameters with which the probe or specific radio headend was configured at the time the packet was captured, such as gain, bandwidth, modulation parameters, etc.
 7. Identification of the software versions running on the radio headend, probe
 8. Identification of the version of the interface specification of the protocol between the probe and the backend
 9. Information identifying error scenarios, or lack of error, regarding the packet being conveyed or condition present at the probe or radio headend
 10. Geographic location of the probe. This is useful in scenarios where the probe is not stationary, or may be utilized to alleviate the necessity of configuring the location of a probe in backend systems.
 11. Internal status conditions of the probe. This can include electrical parameters such as supply voltage, software parameters such as configuration settings and peg counts, or environmental parameters such as internal and external temperatures.

IDS 216 parses the packet streams based on probe location and applies both global and region specific rules to each stream. Rules, policies and stateful modeling is performed at each layer of the custom protocol stack, with IPv4/IPv6 processing being done using the inherent capability of Snort, and all other processing being done by custom preprocessors. IDS 216 maintains state even for transactions as requests sent by a source on one channel need to be correlated with the response typically transmitted on another channel. Some of the key rules, policies, and stateful operations implemented by the IDS are:

A. Secure transactions
B. Insecure transactions, such as clear-text meter reads
C. Transactions originated by field service tools and field technician equipment
D. Unrecognized network identifiers or default network identifiers
E. Excessive node chattiness
F. Port scans against a node
G. Replayed messages
H. Message with bad signatures or security credentials
I. Messages with revoked security credentials
J. Forged or gratuitous DNS and time server responses
K. Forged firmware update messages
L. Sensitive operations, such as meter connects/disconnects and meter table writes
M. Recurring last gasp messages from a node
N. Bad or unrecognized MAC addresses
O. Bad or unrecognized IP addresses
P. Attempts to address backend systems by their IP address.
Q. Layer 2 Man-in-the-Middle attacks An example of a region specific rule is to check the MAC addresses of all received packets in a probe stream against a known whitelist of MAC addresses for the radio coverage area of the probe. In the case where FAN traffic is encrypted at the application layer, IDS rules and policies can still be applied at all lower layers and stateful models of a transaction can still be applied even if the contents of the payload are not readable. In an alternate implementation, the IDS can access the key store used for the FAN/AMI system and retrieve the key material needed to decrypt each payload. Key material can be retrieved based on the MAC or IP addresses of the sender and receiver pair. Similarly, encryption used at lower layers can be decrypted for analysis assuming the IDS has access to the key server.

For scalability in large FANs, the FAN can be divided into multiple sets of collectors, IDSs, and analyzers and IDS events can be reported to a central event management system. The IDS events can be also reported to a security incident and event management (SIEM) system that takes event feeds from multiple sources, including from systems and intelligence feeds outside the FAN, and performs correlation analytics to assess whether seemingly unrelated events and conditions are actually part of a coordinated attack. In another implementation, a virtual collector and IDS are provisioned on a computing platform for each probe, thereby facilitating custom rules and policies for each probe location, such as checking the MAC addresses in an area against a predetermined whitelist.

The Network Analyzer, also referred to as the FAN Analyzer, is a standalone application that decomposes FAN packets into information element. In the preferred implementation, the FAN analyzer is based on a PCAP processing tool, an open-source packet analyzer, which provides a graphical user interface (GUI) to present captured packets and has inherent IPv4/IPv6 capabilities, in addition to supporting other standard protocols used in utility communications. Since FAN traffic uses proprietary protocols specific to each vendor, custom dissectors are written and incorporated into the PCAP Processing Tool. The dissectors parse each byte of received packets and define the structure for presentation in the PCAP processing tool GUI. Similarly, the dissectors make use of PCAP processing tool constructs so that each field in a packet may be used in a search or filter to highlight packets of interest. In the preferred implementation, dissectors are written for the physical frame layer, link layer, custom layers between the link and network layers, routing protocol, time synchronization protocol, node synchronization/maintenance protocol, secure application layer, insecure application layer, C 12.19 tables, and generic meter interface protocol. The dissectors take advantage of CRC-32 libraries to perform checksums on the physical frame. In addition, compression libraries, such as ZLIB libraries, are used to decompress application layer messages. Further, the ability to dissect and filter meta-data contained in packets facilitates multi-dimensional filtering including time, geographic location, and frequency or other parameters.

The FAN analyzer 218 is designed to run on packet traffic files streamed from the collector/disseminator 214 or recalled from the traffic repository. Traffic captures are stored in the data repository in the form of PCAP files. Typically, the files will be accessed upon an investigation of events posted by IDS 216. Alternatively, the user can select which probe packet streams that are of interest to view and the collector/disseminator 214 aggregates and sends out another traffic stream to the FAN network analyzer 218 for live viewing. Multiple FAN network analyzers 218 can be run simultaneously from different locations to support activities by different groups, such as security, operations, and engineering, within a utility. Access rules and privileges can be applied to each account on the client service portal to restrict the type of access to traffic by pre-assigned authorizations.

The probe management system 220 manages the configuration of the probes 112 from remote. Using a separate secure logical channel to communicate with each probe 112, the probe management system 220 configures the distributed IDS rule set stored locally in each probe 112 and the packet triggers, filters, RF frontend and sampling parameters, as well as other system configuration parameters. Probe management system 220 utilizes active polling of the probes 112 as well as information transmitted by the probes to gather information about probe status, their components and health, and operational environment, as well as the status of relevant backend server processes, resources, and conditions. A database is used to store information about the status of the probes, providing archival information for display and analysis of historical data. Probe management system 220 analyzes the current and historical status of each probe, characterizes the status of each probe, and can conduct functions such as generating alarms, performing notifications of technical support staff, or performing remedial or preemptive actions for trouble conditions. A web based graphical interface is among multiple interfaces and overlays, such as geographic visualization, that may be provided. A user interface for technical users displays operational parameters, and status information, provides access to collected and derived data, and is one possible approach for providing user input of system configuration data. Probe management system 220 can also instruct a probe 112 to transmit a specific packet for test, diagnostic, and incident response purposes. The probe management system also manages code updates to each of the probes.

The set of conditions under which packets should be considered as having errors and thus discarded, or captured and transmitted can also be configured by the probe management system. For example, packets indicating transmission on a frequency different from that on which they were actually received might typically be considered as having errors. However, under some circumstances this could represent anomalous behavior, or potentially attacks against the utility infrastructure.

Figure 5:
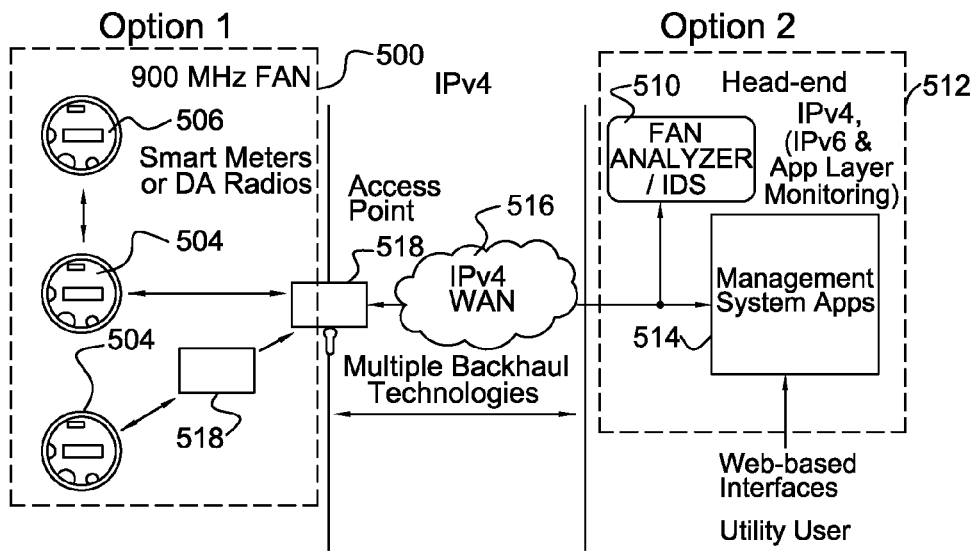
FIG. 5 illustrates a headend-based FAN analyzer/IDS architecture.

Referring to FIG. 5, in some situations, the deployment of field probes 112 may be inconvenient or the utility may be more interested in monitoring the traffic transgressing in and out of a headend compartment 502, to audit hosted network management services or their own users of FAN backend applications. In an alternative architecture, a probe can be positioned at the FAN headend 512 to monitor traffic between the headend management system and access points. Headend management system applications 514, which use on web-based interfaces, may also be monitored in the FAN headend 512. In this architecture, the headend probe only has access to a portion of the traffic flowing between the headend management system and access points, which is generally the upper layers in the protocol stack. The physical, media access control, link layer, custom layers between the link layer and network layer are not visible to the probe from this vantage point. In a preferred implementation, one or more headend probes are positioned to intercept traffic at the IPv4/IPv6 layer in the headend management system compartment and field probes intercept traffic at each access point 518. As previously mentioned, access to the key server will permit the FAN backend monitoring applications to decrypt encrypted traffic. A benefit of headend probes is that traffic statistics and tallies of commands and messages issued into the FAN from backend applications can be compared against headend application logs and work authorizations to identify commands or traffic for which there is no related authorization or log.

Figure 6:
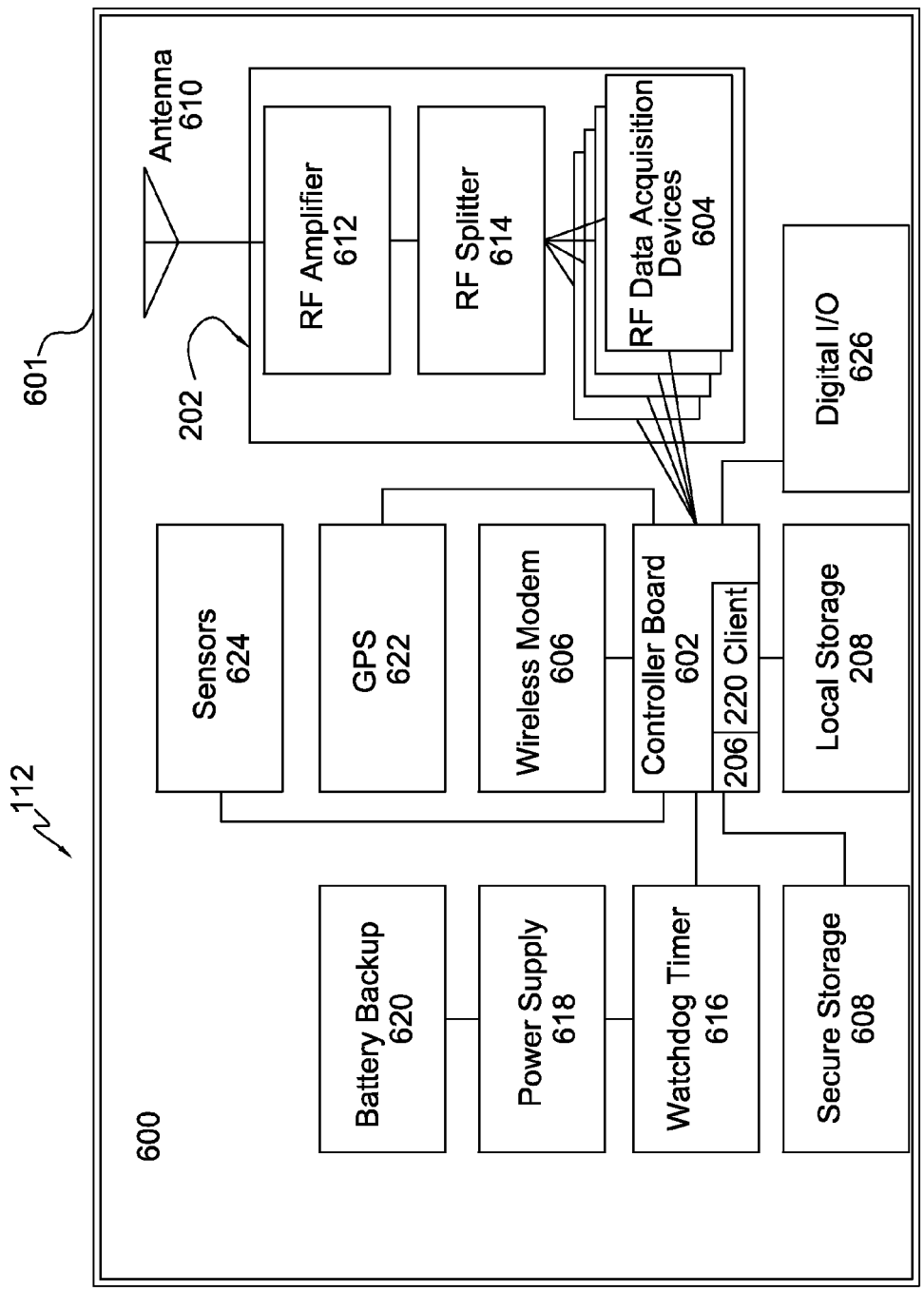
FIG. 6 is block diagram of a probe subsystem.

Referring to FIG. 6, the primary function of the probe subsystem 600 is to capture the FAN traffic and transmit this traffic to the FAN backend monitoring subsystem for processing. The probe subsystem 600 is contained in a weatherproof housing 601 designed with a double hull. The outer hull provides a sunshield to protect the equipment from direct radiation and mounting points for universal struts so that it can be attached to a pole, building, or vehicle. The inner hull houses the electronic components in a weather tight enclosure, where the air has been evacuated or replaced with a dry, inert gas. Desiccants are placed inside the inner housing to absorb any remaining moisture. Both enclosures are designed to withstand the physical stress of an external environment. The probe subsystem 600 comprises several functional components, including the following:

A controller board 602 performs processing and I/O tasks during the operation of the probe 112. Significant functions include the following:
Implements control logic
Receives FAN traffic from the RF data acquisition boards 604
Timestamps and formats data, adding metadata (e.g., RF channel, received signal strength indication, etc.)
Caches data for transmission
Initiates and manages secure transmission channels via a wireless modem 606 to the probe management system 220
Transmits data to the probe management system 220
Implements Distributed IDS Processing
Manages local processes and systems
Processes remote management commands
Dynamically sets RF and channel parameters
Acquires GPS information In a preferred implementation, controller board 602 is an industrial controller board or equivalent that is rated for an extended temperature range and environmental stresses. Preferably, it uses a Linux-based operating system. A significant design consideration for the software and hardware of the probe 112 is to limit the security risks should a probe 112 be lost or stolen. Probe 112 is designed to introduce no greater security risks than already exists in the field equipment that is it trying to monitor. The use of SSH tunneling, for example, protects the backhaul transmission channel that contains concentrated traffic captured from multiple over-the-air channels. Similarly, descrambling of the traffic is not performed in probe 112 in the preferred implementation. Instead, descrambling is performed in the FAN backend monitoring subsystem to prevent an attacker from reverse engineering the hardware and software to extract the decoding logic.

While the bulk of packet and intrusion analysis is conducted in the FAN backend monitoring subsystem, the architecture also supports distributed intrusion detection processing. In this case, the processing capacity of the probe controller is utilized to perform intrusion analysis and upon an event, immediately provide an alert to backend management systems. In the situations where traffic can be decoded without presenting additional security risks, a lightweight version of the IDS system used in the backend (i.e. a version of Snort) with a custom and possibly more limited policy set that is not too resource intensive can be installed on each probe 112 to perform deep packet inspection and behavioral analysis. If packet decoding cannot be performed by probe 112, for instance, due to security reasons, distributed IDS processing can still be applied in the form of traffic analysis, such as analyzing the characteristics of channel usage and the source and destination of packets, if such information is not coded or encrypted.

Controller board 602 dynamically sets the RF and channel parameters of RF data acquisition cards 604, depending upon the acquisition mode. In the fixed, sampling mode with a multi-channel system, a number of channels n that is less than the total number of channels in the system N are monitored. The choice of channels to monitor in this mode is static. In the dynamic, sampled mode, the monitored channels are changed during the capture, depending upon policy. With a uniform policy, all channels are monitored for the same period of time in sequential or random order. With a tracking policy, the data acquisition card 604 hops in synchronization with the monitored device as it moves through its epoch of channels in a frequency hopping system. This policy enables the probe 112 to listen to all packets going to the monitored node. To remain in synchronization with the monitored node, the controller needs to compute where the monitored node will be in frequency at any point in time. This can be accomplished by recording the time when a packet was received and noting the channel it was received on, then calculating the frequency hopping pattern based on MAC address (as in United States Patent Application No. 2009/0168846, mentioned above), and then running time forward to identify the current timeslot and frequency. In the channel seizure sense mode, probe 112 listens or scans multiple channels and upon hearing the channel seizure signal (typically a repeating pattern of 1 s and 0 s), the controller tunes a data acquisition card to the channel. Depending upon the length of the channel seizure signal and the energy detector used, multiple cards may be designated to scan for channel activity so as to identify an active channel before the start of the physical frame. Finally, in the full spectrum probe, all channels N in the system are simultaneously monitored.

Storage 608 provides local nonvolatile memory. Functions include local caching of FAN data. This allows for continuity of data being collected and ultimately backhauled to the FAN backend monitoring subsystem during intervals where wireless connectivity may be interrupted or otherwise become unavailable. Storage 608 also provides memory that is required by the operating system. In a preferred implementation, storage is implemented using a solid state drive, or disk-on-module. However, any type of nonvolatile storage may be used.

Secure storage 608 provides protected non-volatile memory for security credentials, such as Public Key Infrastructure (PM) private keys and certificates, passwords, shared secrets, and other cryptographic keys. The Secure Storage, similar to a Smart Card, mobile phone SIM, or trusted computing component (secure FLASH), is designed to resist reverse engineering, snooping, and physical attacks that might reveal the security credentials that its holds. In the worst case, the Secure Storage destroys the information upon tampering rather than revealing it to the attacker. Secure storage 608 can also be used to hold captured traffic traces that have not yet been transmitted to the backend. However, in the preferred implementation, the traffic traces are encrypted, stored it in normal memory and just the cryptographic keys are stored in secure storage 608.

Wireless Modem 606 provides connectivity via wireless technologies such as 3G or LTE. Other technologies such as 802.11 could be used depending upon availability. Alternative means of communication such as wired Ethernet, cable, etc. could also be employed depending on availability and preference. Under some circumstances, the use of a private network can be employed to provide additional security, including isolation of probes 112 from all entities except the probe management system 220. Functions include:

Providing connectivity between probe 112 and probe management system 220 for data backhaul and probe management;

Providing SMS capability, facilitating limited communications when IP connectivity via the wireless data service is unavailable, e.g., information about the state of the probe subsystem 600 can be conveyed to the team responsible for managing these devices; and Optionally, providing GPS receiver functionality.

In the preferred implementation, the wireless modem is implemented using a 4G LTE wireless technology.

The RF data acquisition section comprises an antenna 610, an RF amplifier 612 and an RF splitter 614. Antenna 610 creates an electrical signal from the electromagnetic spectrum of interest and feeds the signal amplifier 612. Antenna 610 is constructed for the frequency band in which FAN traffic being captured, such as 902-928 MHz, 2.4 GHz, with pattern and gain matching the deployed area of coverage and location of the FAN devices being monitored. Amplifier 612 compensates for the loss introduced by RF splitter 614, provides additional gain as required by the selected antenna, and improves the probe's range and signal strength of the FAN devices being monitored. RF splitter 614 provides the RF signals captured by the antenna and amplified by the RF amplifier to each of the RF data acquisition devices 604. RF data acquisition devices 604 demodulates FAN traffic and provides the data to controller board 602. Other functions of RF data acquisition devices 604 include:

An RF receiver capable of being tuned to the frequencies on which the FAN traffic of interest operates, e.g. 902-928 MHz, 2.4 GHz range, and capable of extracting the received FAN traffic using the corresponding modulation technique (such as, for example, 2FSK);

Accepting RF configuration parameters from controller board 602, such as, but not limited to receive frequency, gain, AFC, AGC, data rate, and start word;

Detecting the beginning of a transmitted packet, performing bit and byte alignment, determining packet length and other parameters from the received bytes;

Measuring the received signal strength of the received packet;

Qualifying the packet based on interpretation of selected received parameters, and ceasing processing of disqualified packets;

Transmitting received packets to controller board 602;

Accepting firmware updates from controller board 602; and

Providing protection of resident firmware, if physical compromise should occur; for example, prevent the firmware from being read;

Scanning a range of frequencies for transmissions, and provide indication of detection of a transmission; and Tuning receive frequencies according to a specified hopping sequence, in order to receive specifically targeted transmissions.

In one implementation, each data acquisition device receives on a single frequency. In another implementation, one or more of the RF receivers scan the spectrum by varying this frequency over time searching for the start of a transmission. Multiple devices are employed to enable capture of multiple simultaneous transmissions. Preferably, such an implementation makes use of commercially available RF transceiver integrated circuits, potentially in conjunction with a separate microcontroller.

In another implementation, a single device acquires transmissions across a wide frequency band of interest, employing digital signal processing techniques to digitally process and demodulate multiple channels. Such an implementation makes use of software defined radio technology.

Communications between the RF data acquisition devices 604 and the controller board 602 can be implemented using standard asynchronous serial communications protocols and UART/USART devices, or a USB connection.

A watchdog timer 616 provides multiple functions (FIGS. 4, 5, 6), including system recovery in the event that the controller board becomes unresponsive or "hung up"; initiation of graceful shutdown; and power cycling.

Watchdog timer 616 can be a separate hardware unit implemented using analog circuitry. It is designed to receive, and under normal circumstances, pulses at periodic intervals from controller board 602, or it initiates a graceful shutdown of controller board 602, followed by a power cycle of the entire probe 112 except for the watchdog timer 616 itself. The controller board can be programmed to initiate this intentionally, by cessation of the expected pulses, in order to cause power cycling since some components can only be initialized or returned from a bad state by a power cycle.

Power supply 618 provides power to probe 112. Application of power to probe 112 components is controlled by the watchdog timer. An external source of power may include AC power from power lines available at a utility pole, or from AC or DC power provided by a vehicle.

A battery backup 612 may be provided to keep probe 112 operational if commercial power is lost for fixed installations. In mobile installations, such as a fleet truck, battery backup 620 permits probe 112 to remain operational while the vehicle engine is not running without the risk of discharging the vehicle battery. The vehicle key switch or a similar safeguard disconnects the probe from the vehicle battery when the vehicle is not running. Additionally, the mobile probe can sense the operation of the engine by monitoring the charge voltage created by the vehicle's alternator or the periodic use of the vehicle brake light that occurs under normal driving conditions.

In some deployments, probe 112 is equipped with a GPS receiver 622; one example would include deployment on a vehicle. GPS receiver 622 may be separate unit, or this function may be provided by another existing component such as the wireless modem 606. GPS data is transmitted to FAN backend monitoring system along with timestamps so that the received FAN traffic can be correlated with the GPS position data. GPS receiver 622 may also be used with fixed probes 112 as a locator if the device is stolen or lost.

Probe 112 contains a series of sensors 624 that are read by the controller either through an installed program or on-demand by a remote command from the probe management system 220. Temperature sensors (not shown) measure the temperature of components and air inside the enclosure. Tamper switches (not shown) report if the housing 601 has been physically opened. Humidity sensors (not shown) report leakages in the weather tight seal of the enclosure.

Probe 112 contains a digital Input/Output capability 626, such as a general purpose USB-based I/O card that permits the controller board 602 to control relays and send signals to various boards in the assembly. Two key uses of the Digital I/O capability are to periodically strobe the watchdog timer 616 to indicate processor health and to support firmware updates on the data acquisition devices 604.

Figure 7:
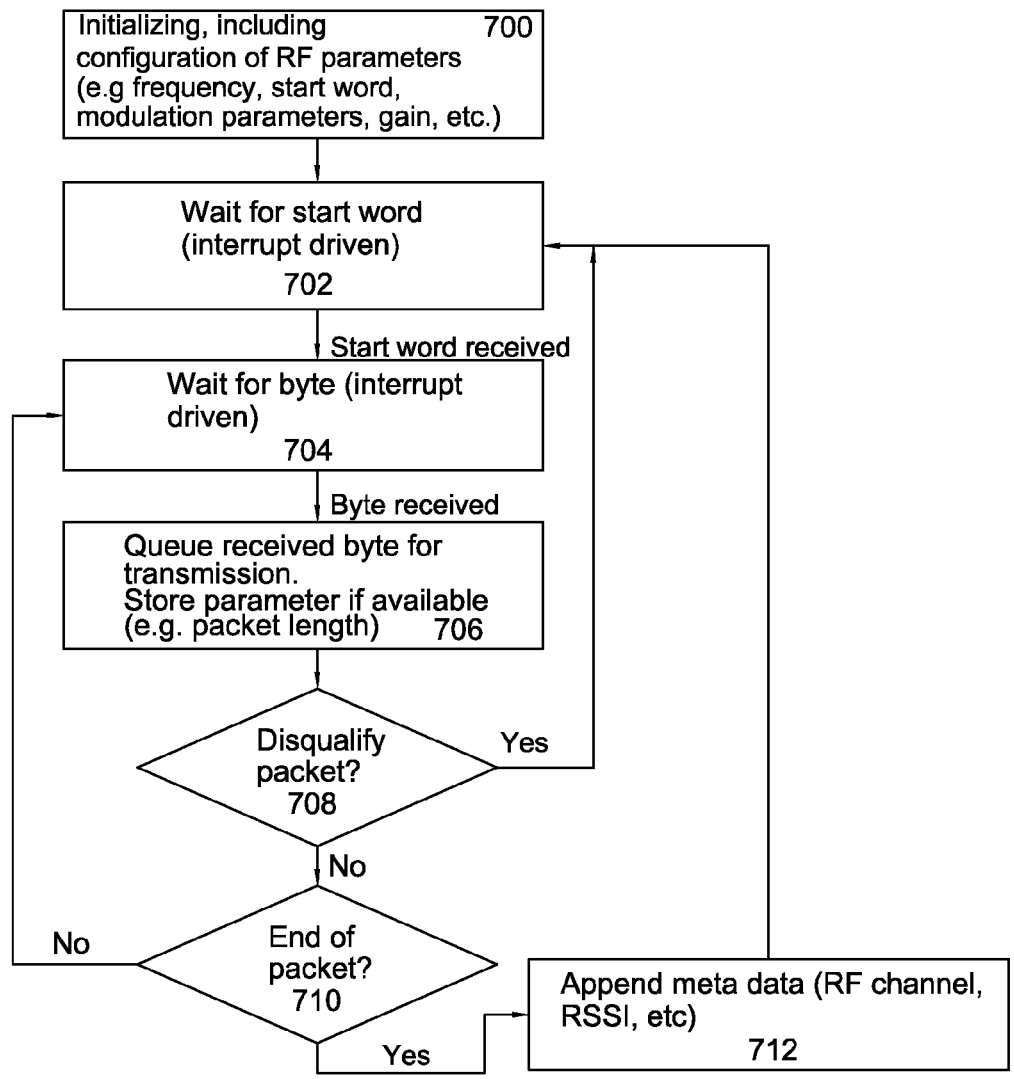
FIG. 7 is a flow chart of the FAN data acquisition process of the RF data acquisition device of FIG. 6.

Referring to FIG. 7, the probe packet acquisition process is initialized at 700, including configuration of RF parameters (e.g., frequency, start word, modulation parameters and gain) for the RF data acquisition devices 604. At 702 data acquisition devices 604 wait until a start word is received. At 704, data acquisition devices 604 wait for a data byte to be received. At 706, when a byte is received it is queued for transmission to the controller board 602. If parameters are available, such as for example, packet length, these parameters are stored. At 708, a determination is made, as to whether a packet should be disqualified, such as for example, when certain rules are not met, as described below with respect to FIG. 16, or if data integrity is not sufficient for meaningful data to be recovered from one or more packets. At 710, a determination is made as to whether the end of a packet has been processed. At 712, metadata, such as RF channel designation and received signal strength indication (RSSI) is prepended to the packet.

Figure 8:
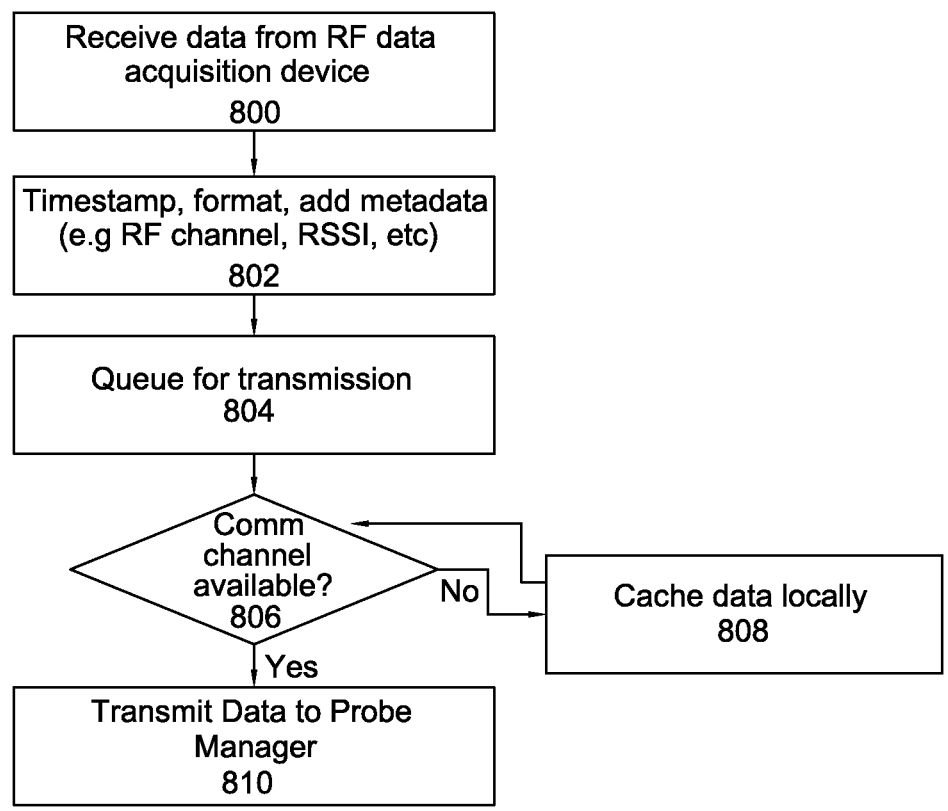
FIG. 8 is a flow chart of the data caching and transmission process of the probe controller board of FIG. 6.

Referring to FIG. 8, data caching and transmission to controller board 602 is illustrated. At 800, data is received from a data acquisition device 604. At 802, packets are time stamped, formatted and any additional metadata is appended. At 804, the data is queued for transmission. At 806 a determination is made as to whether a communication channel is available. If a communication channel is not available, the data is cached in local storage at 808. When a communication channel becomes available, as determined at 806, the data is transmitted to the FAN backend monitoring system.

Figure 9:
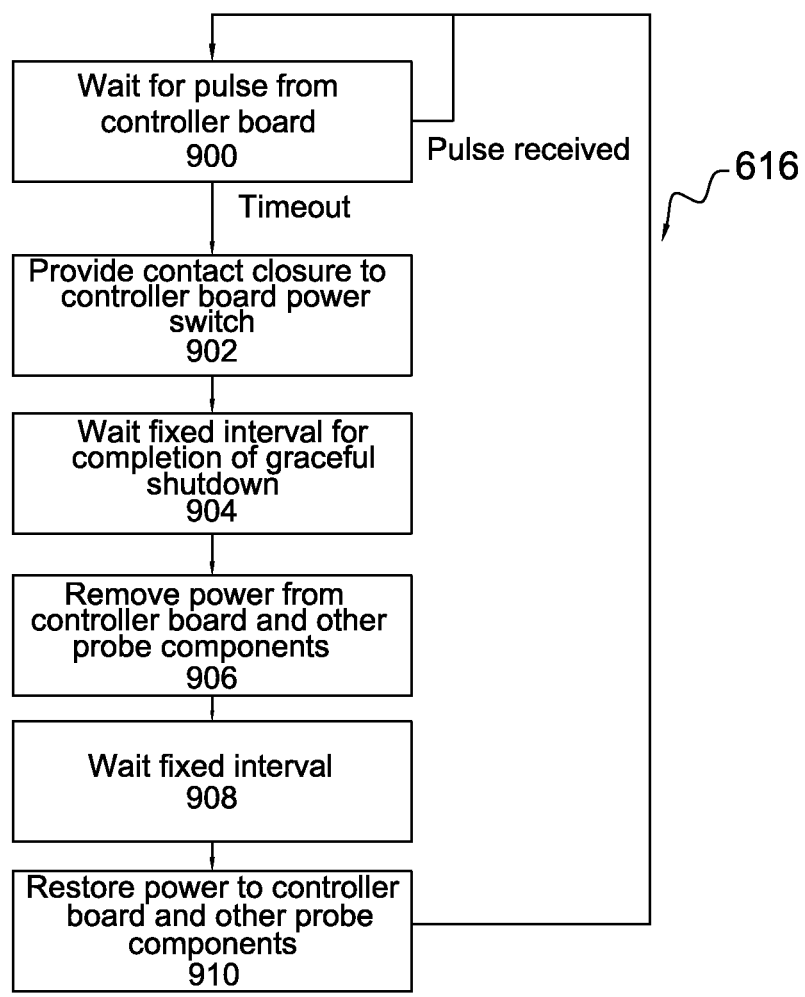
FIG. 9 is a flow chart of the probe watchdog timer process of the watchdog timer of FIG. 6.

FIG. 9 illustrates the operation of the watchdog timer 616. At 900, the watchdog timer 616 waits for a pulse from controller board 602. If a pulse is received before watchdog timer 616 times out, watchdog timer 616 is reset, and continues to wait for another pulse. If watchdog timer 616 times out, at 902, a contact closure is provided to a power switch on controller board 602. At 904, there is a waiting period, generally of fixed duration, that is observed, until a graceful shut down of controller board 602 is initiated. At 906, power is removed from controller board 602 and from other probe components of probe subsystem 600. At 908, there is another waiting interval, again generally of fixed duration. At 910, power is restored to controller board 602 and other components of probe subsystem 910. Control is returned to 900.

Figure 10:
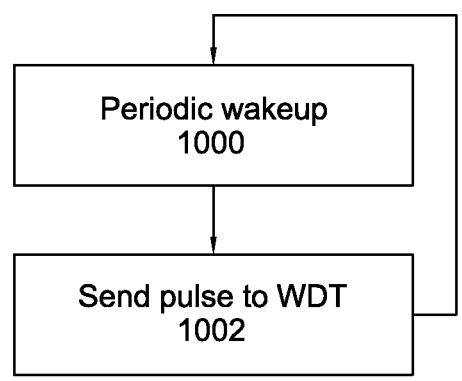
FIG. 10 is a flow chart of the watchdog timer utilization process of the controller board of FIG. 6 during normal operation.

FIG. 10 illustrates normal watchdog timer operation from the viewpoint of controller board 602. At 1000, there is a periodic wake up of a watchdog pulse generator on the controller board 602. At 1002 a pulse is sent from controller board 602 to watchdog timer 616.

Figure 11A:
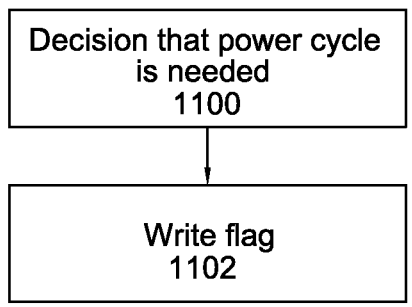
FIG. 11A is a flow chart of the watchdog timer utilization process of the controller board of FIG. 6 during initiation of a power cycle.

FIG. 11A illustrates the use of a check flag to implement a power cycle operation using the watchdog timer procedure of FIG. 10. If there is a decision that a power cycle is needed at 1100, an application on the probe writes a flag at 1102.

Figure 11B:
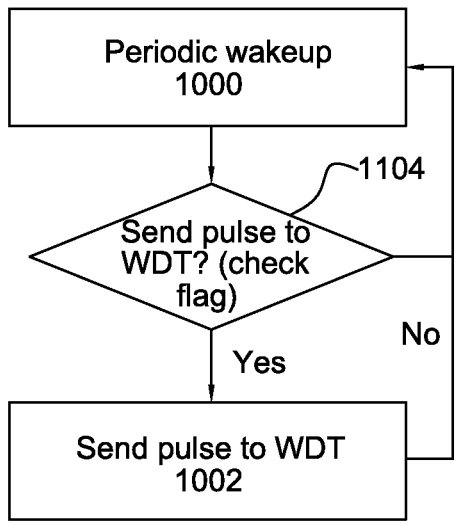
FIG. 11B is a flow chart of the manner in which a power cycle is initiated.

Referring to FIG. 11B, the periodic wakeup of the watchdog pulse generator process occurs at 1000. At 1104, the flag set at 1102 is read by the watchdog pulse generator process. If the flag indicates that a power cycle is required, no pulse is sent by the watchdog pulse generator and control goes to 1000. If the flag indicates that a pulse should be sent to watchdog timer 616, then control shifts to 1002, and a pulse is sent.

Figure 12:
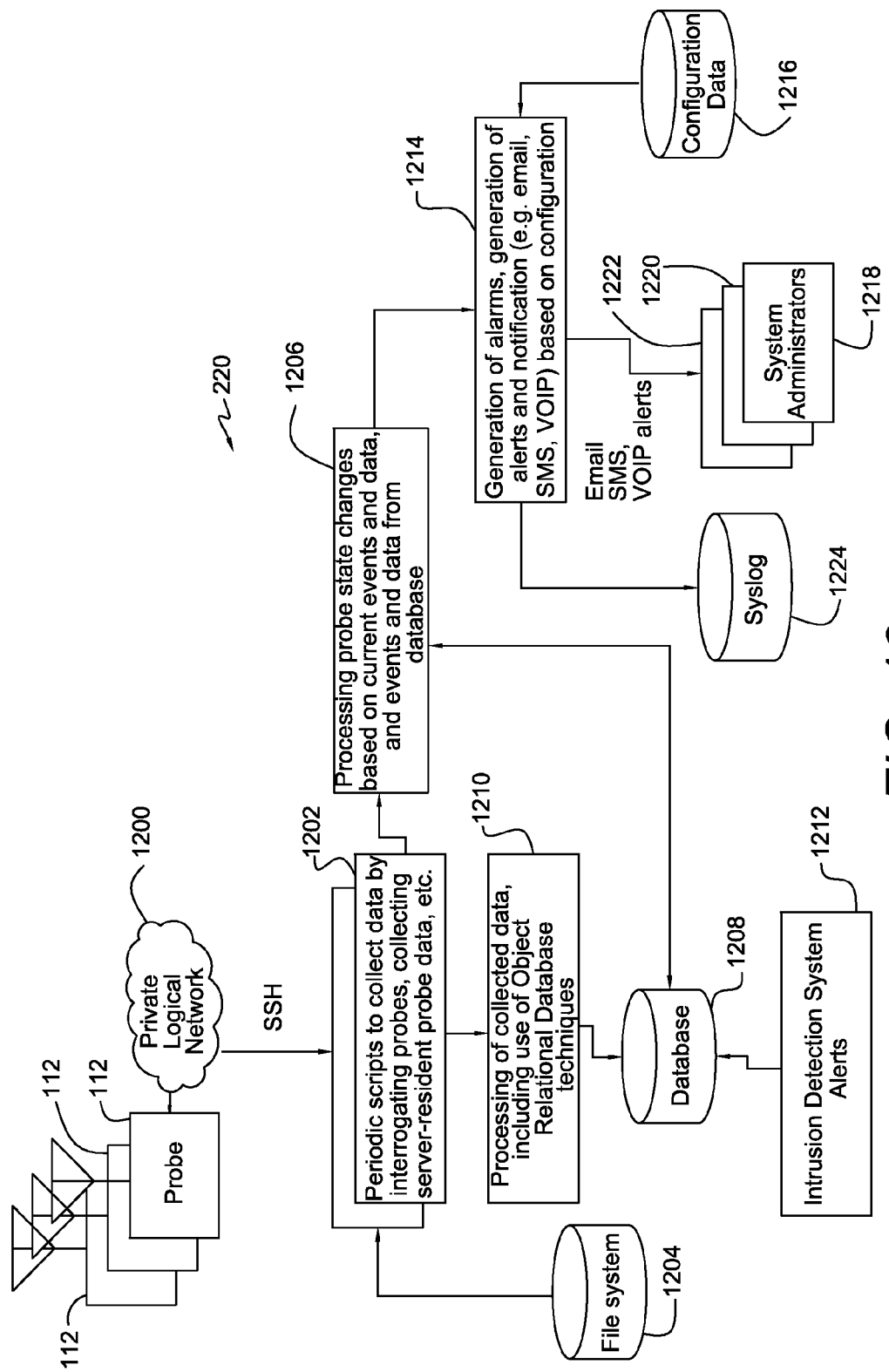
FIG. 12 is a block diagram of the components of the probe management subsystem.

Referring to FIG. 12, health and control information is received and transmitted via a private logical network 1200 between probes and probe management subsystem 220 in the FAN backend monitoring subsystem using an SSH protocol. The probe management subsystem 220 monitors the health of probes and make changes to the configuration of probes 112 from a remote location. The probe management subsystem 220 comprises several functional components and features. These include scripts 1202 that run periodically to collect data by interrogating probes 112, collect server-resident probe data from a file system 1204, and other probe data. At 1206, probe state changes based on current events and data, and events and data from a database 1208, are processed. At 1210, data is processed, as described below, including by the use of object relational database techniques. The processed data is then stored in database 1208, along with IDS alerts, as represented at 1212, and as discussed below with respect to FIG. 16. At 1214, based on a selected configuration in a configuration data store 1216, alerts and notifications (in the form of e-mail 1218, SMS 1220 or VoIP 1222 are generated. The alerts and notifications are stored in a system log database 1224.

Figure 13:
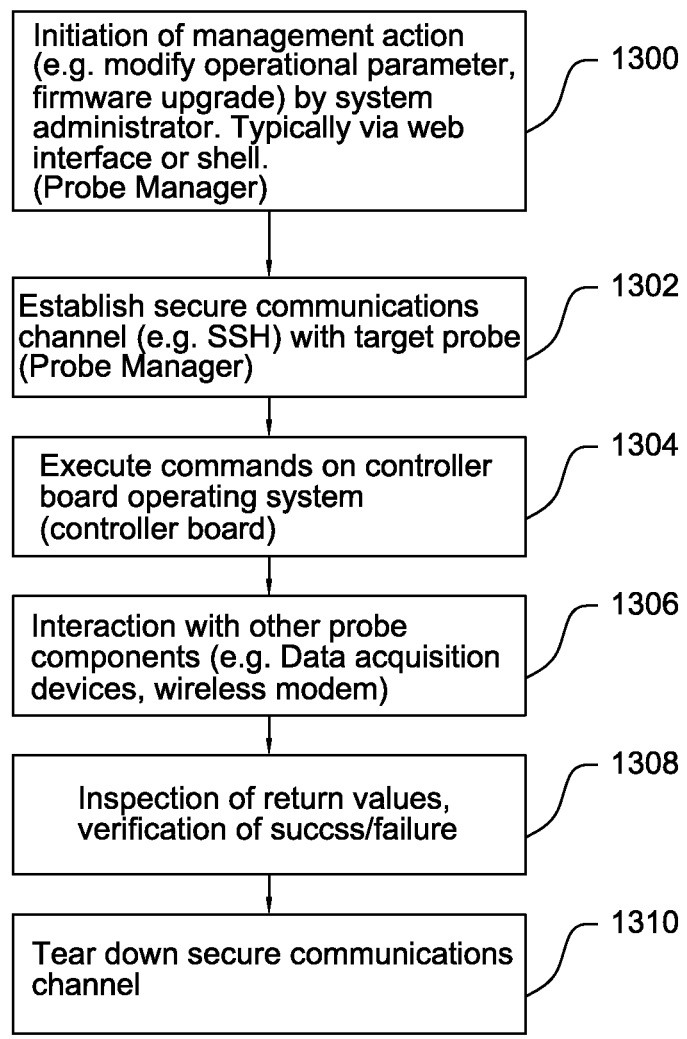
FIG. 13 is a flow chart of the components of the remote management of probes process of the probe management subsystem of FIG. 12.

FIG. 13 illustrates the process for remote probe management. At 1300 management action is initiated. For example operational parameters are modified, and firmware is upgraded by a system administrator. This is typically done by the probe management subsystem 220 via web interface or shell. At 1302, a secure communications channel, via SSH for example, is established with a target probe by probe management subsystem 220. At 1304 commands are executed on the operating system of the controller board 602. At 1306, interaction occurs with other probe components, such as data acquisition devices 604, and wireless modem 606. At 1308 return values of various parameters are inspected for verification of success or failure in transmission to the probe or probes 112, and a successful update of their configurations. At 1310 secure communications channels may be closed or "torn down" to enhance security.

Figure 13A:
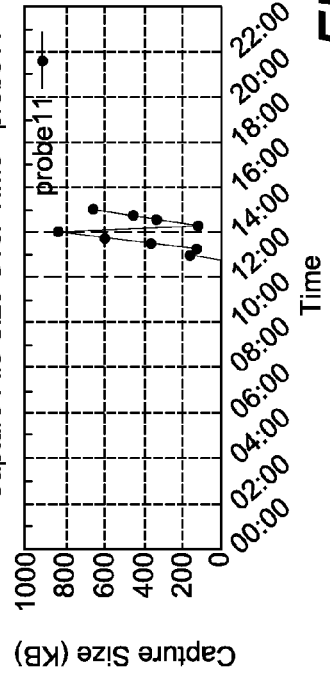
FIG. 13A is probe management dashboard GUI generated by the probe management system.

FIG. 13A is probe management dashboard GUI generated by the probe management system.

Figure 14:
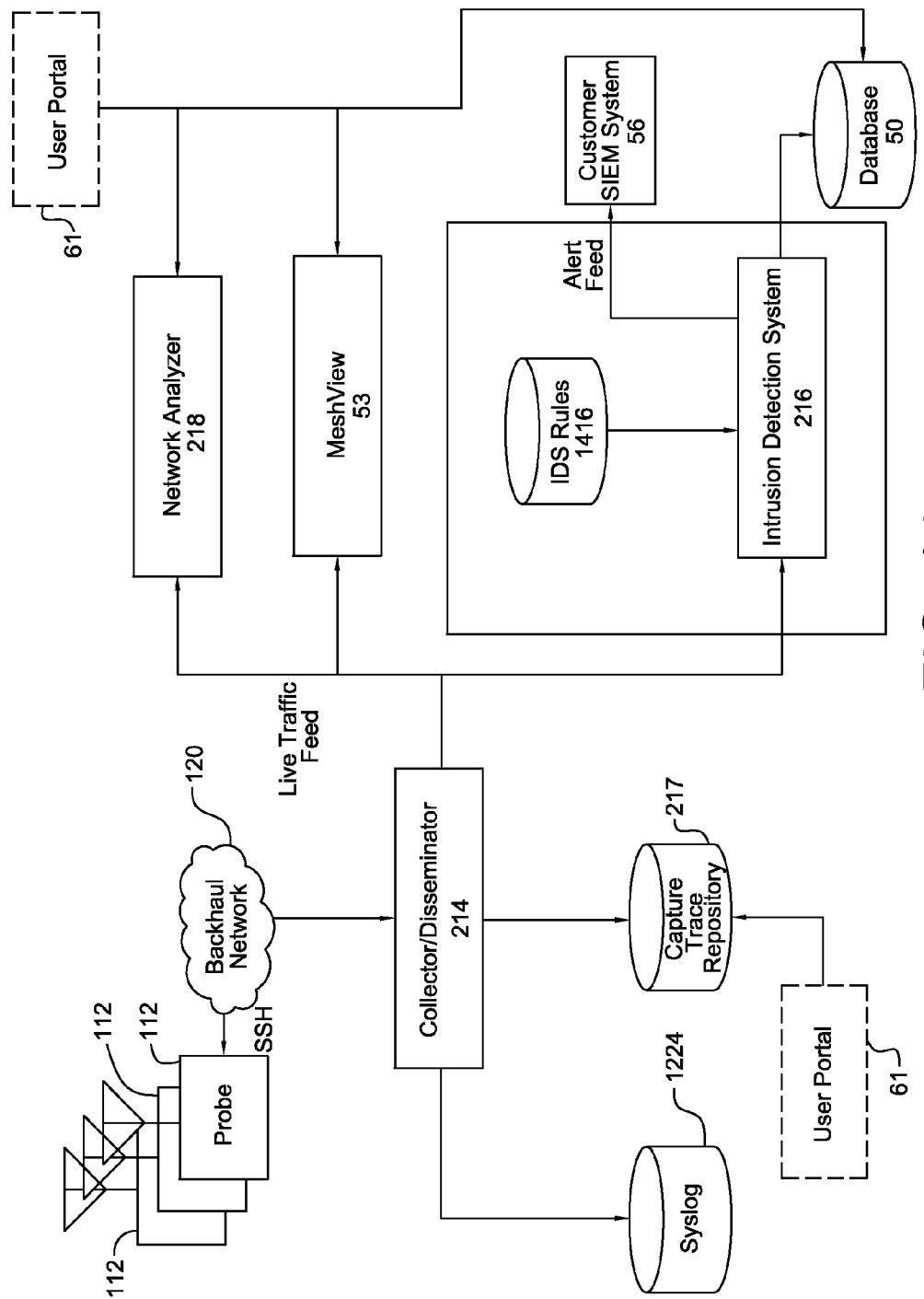
FIG. 14 is a block diagram of the components of a data processor subsystem.

Referring to FIG. 14, the overall function of the collector/disseminator 214, referred to here as the data processor subsystem is to process the incoming data stream to provide a live view of network traffic including that from probes 112 as transmitted via backhaul network 120, and to create feeds for the IDS and other analysis capabilities in the backend. The data processor subsystem comprises several functional components. These include a FAN data processor, which processes data that is received from the probes; functions include the following:

Implementing the backend portion of the Secure SSH tunnel;
De-multiplexing multiple probe transmissions contained in one TCP session into multiple separate probe feeds;

Processing metadata, including extracting time stamp, and RF channel identification;
Descrambling data messages;
Providing live feed to a network analyzer on a user portal 1402;
Transmitting a data stream to an IDS 1404;
Storing a history of network captures in a data capture repository 1406; and
Logging probe metrics in system log data store.

Intrusion detection system 216 inspects network traffic for suspicious activity and generates alerts; functions, as further described below with respect to FIG. 16, include the following:
  detecting packets that contain a FAN network layer,
  analyzing FAN network layer via a pre-processor, to detect fields such as a CRC checksum (if present), a MAC address and a FAN network ID,
  executing rules against several kinds of data observed in the FAN network layer, the IPv6 layer, and the application traffic layer,
  when a rule detects suspicious activity, logging alerts in a database 1410, and sending the alerts to administrators, via e-mail, SMS, VoIP as described above, and
  feeding alerts electronically to a customer security incident and event management system (SIEM) 1412 for correlation with other known security data.

An IDS rules set 1416 provides a configurable set of policies for each probe deployment at several network layers:
  Physical, media access control, link and custom layers between the link and network layers, collectively referred to as the FAN network layer, detecting issues such as:
    (a) CRC errors—by comparing CRC in packet against computed checksum
    (b) unknown devices—by comparing MAC address against known whitelist
    (c) unauthorized meter movement—by comparing MAC address against known whitelist
    (d) unauthorized devices—by detecting unknown FAN network IDs
  IPv4/v6 layer, detecting issues such as
    (a) port scans—by observing traffic frequency
    (b) insecure communication—by observing incoming port usage
  FAN application layer, detecting issues such as
    (a) use of sensitive/restricted commands (remote disconnects, configuration modifications, firmware uploads, etc.)—by observing command codes
    (b) excessive node chattiness—by observing traffic frequency per node
    (c) routing attacks (i.e. blackholes, redirection)—by observing suspicious routing messages
    (d) bad signatures—by observing signature data
    (e) replay attempts—by observing repeated messages.

Capture trace repository 217 provides an historical set of network captures that can be viewed by a FAN analyzer on a user portal 61. A live traffic feed from collector disseminator 214 provides a near real time feed of network data acquired by each probe. Clients of the feed include the FAN analyzer and network visualization tools, as described in more detail below.

Figure 15:
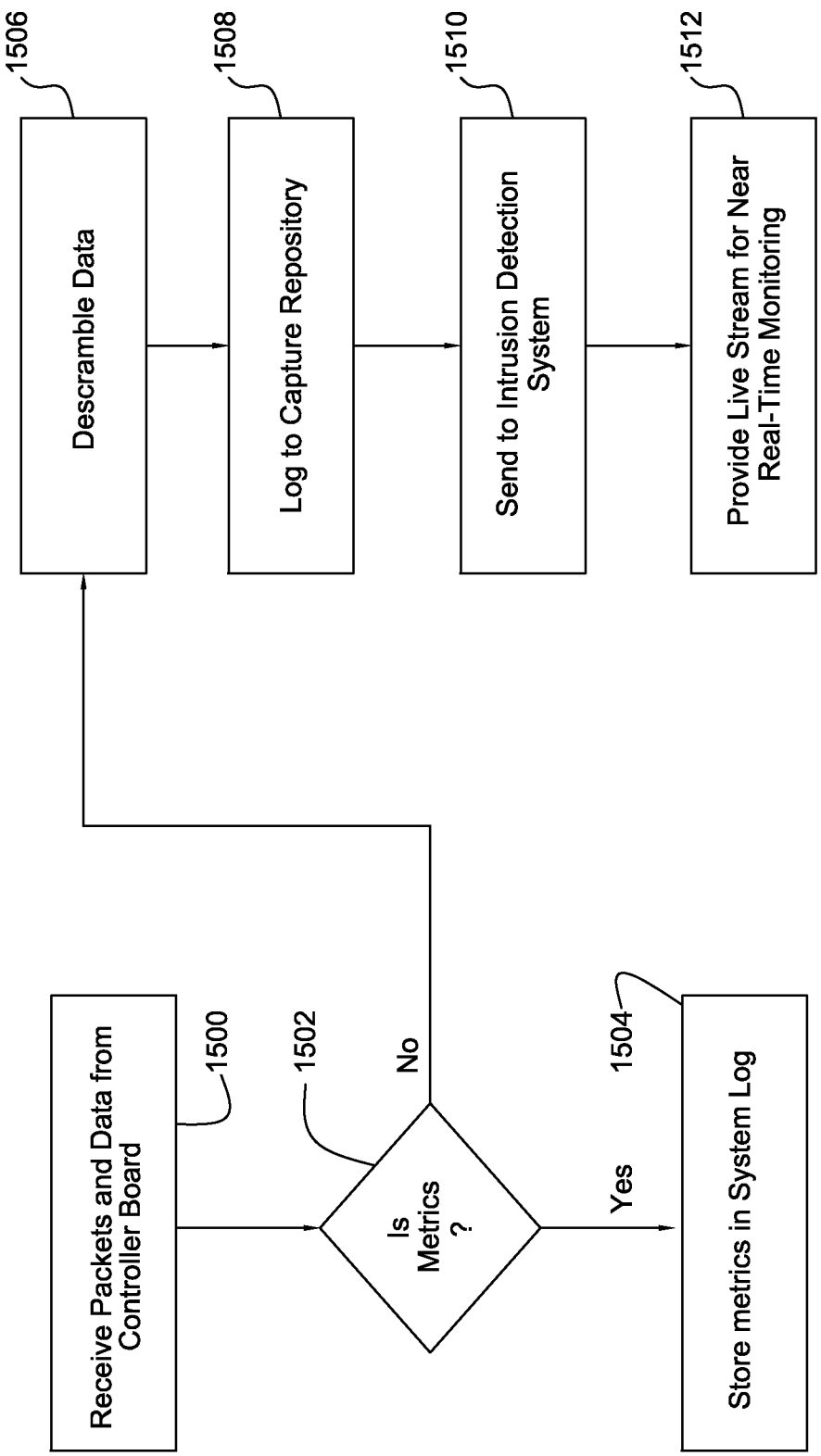
FIG. 15 is a flow chart of the flow process of the collector/disseminator of FIG. 14.

FIG. 15 illustrates the data process of the collector/disseminator. At 1500, data is received from controller board 602. If there is a determination at 1502 that metrics are present in the data, at 1504, the metrics are stored in a system log. If metrics are not present in the data, the data is descrambled at 1506. At 1508, descrambled data is converted to a PCAP file format and stored in a data capture repository 1406. At 1510, the data is sent to IDS 1404. At 1512, a live data stream is provided for near real time monitoring of the data.

Figure 16:
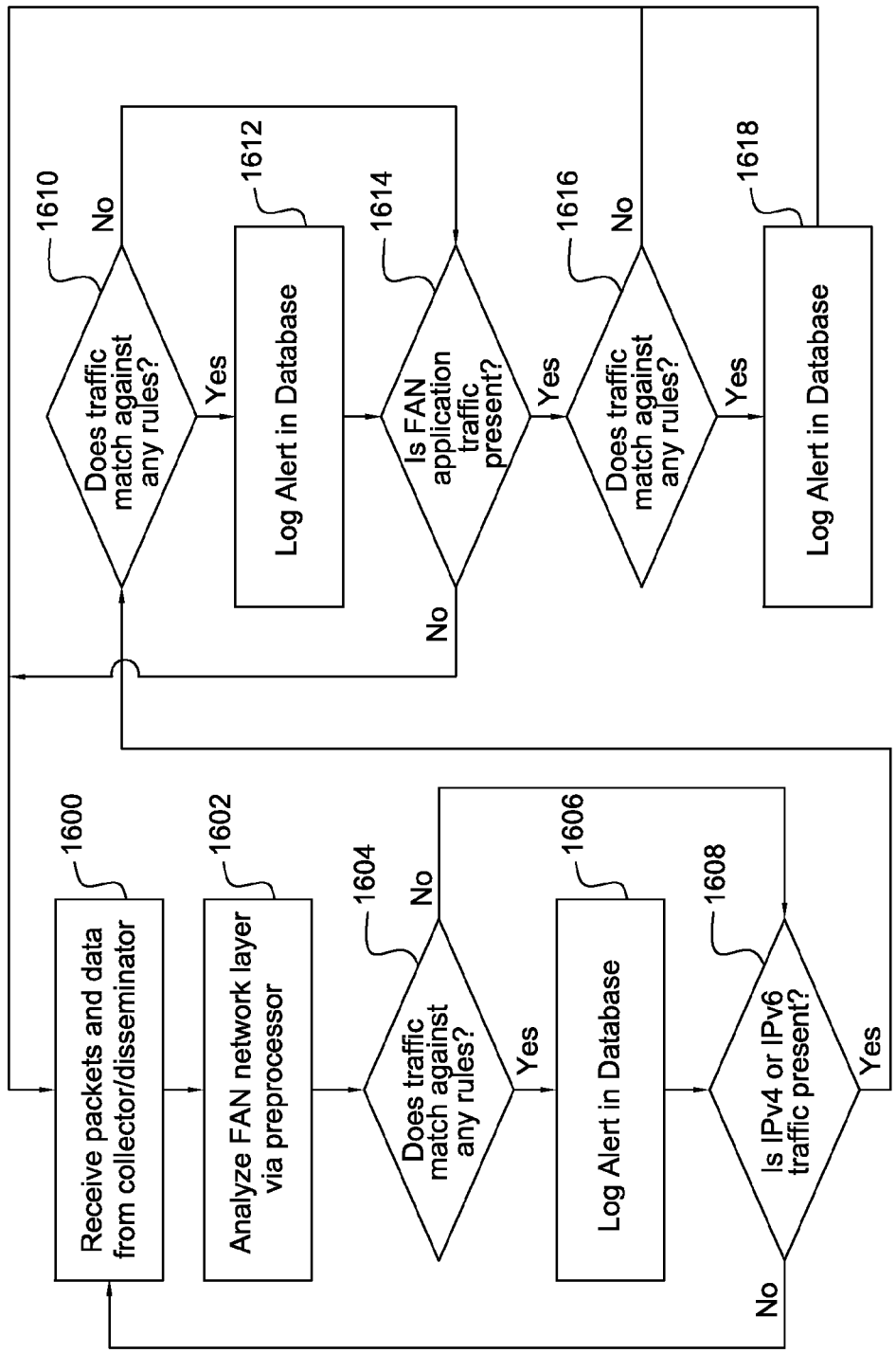
FIG. 16 is a flow chart of the intrusion detection system process executed by the data processor of FIG. 14.

FIG. 16 is central to the IDS process. At 1600, packets are received from the collector/disseminator 214 (also referred to as data processor 1400). At 1602, a preprocessor is used to analyze the FAN network layer. At 1604, a determination is made as to whether traffic matches any rules that indicate an intrusion in the first rule set. At 1606, an alert is logged if there is a match to any such rule or rules. If at 1604, there is no match any of the rules, logic flow proceeds to 1608 where a determination is made as to whether IPv4/IPv6 traffic is present. If no such traffic is present, logic flow returns to 1600. If IPv4/IPv6 traffic is present then at 1610, a determination is made as to whether the traffic matches any IPv4/v6 rules that indicate an intrusion based on a second set of rules. At 1612, an alert is logged in the alert database if there is a match to any such rule.

If there is no match with any rule concerning IPv4/v6 traffic indicative of an intrusion, then logic flow is from 1610 to 1614. At 1614, a determination is made as to whether FAN application traffic is present. If no FAN application traffic is present, logic flow returns to 1600. If FAN application traffic is present, at 1616 a determination is made as to whether the traffic matches any rules indicative of a FAN application traffic intrusion using a third rule set. If no rules indicating a FAN application traffic intrusion are matched, logic flow returns to 1600. If a rule indicating a FAN application traffic intrusion is present, at 1618 an alert is logged in the alert database. Logic flow returns to 1600.

Figure 17:
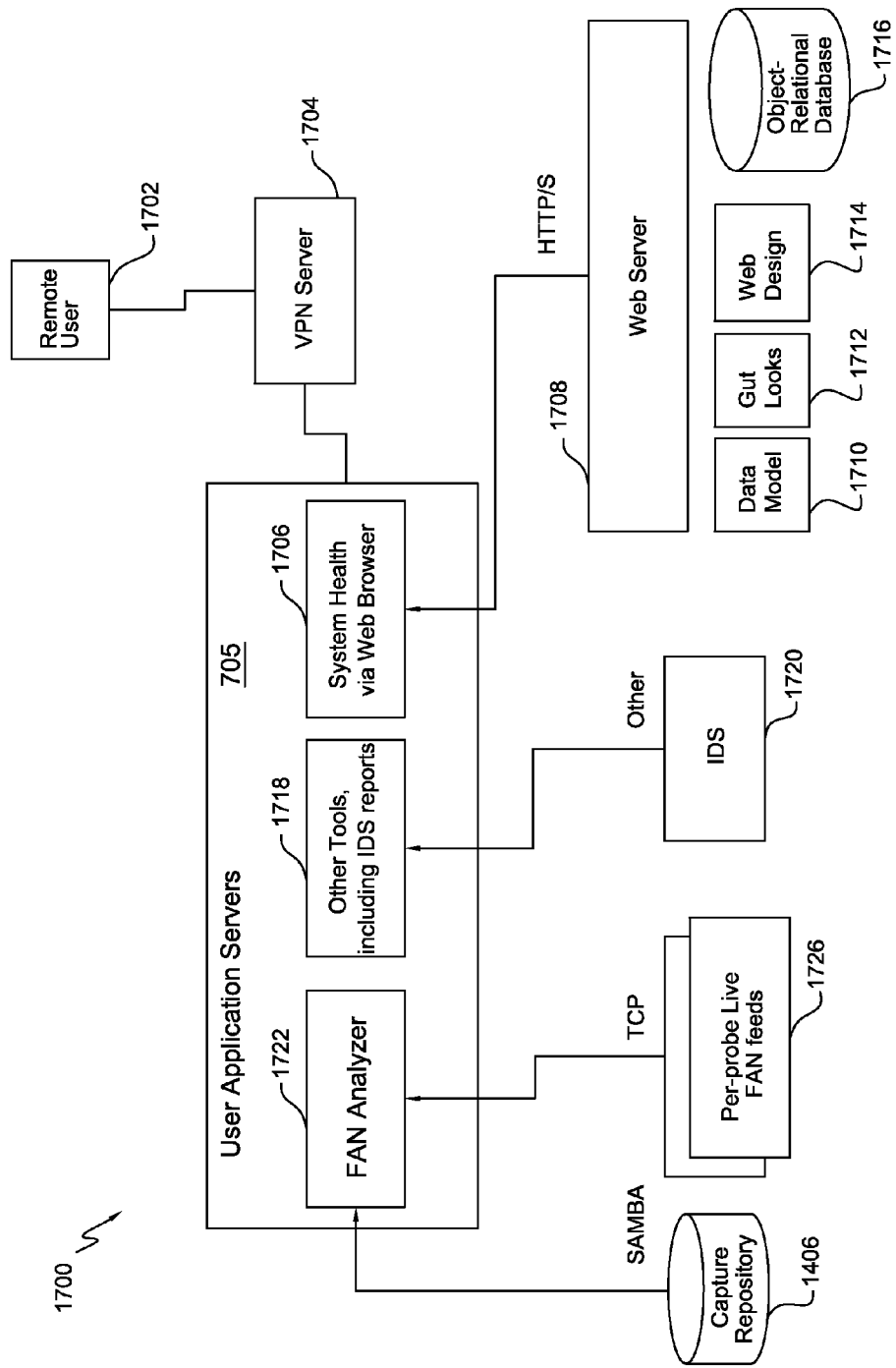
FIG. 17 is a block diagram of the components of a user portal subsystem of FIG. 14.

FIG. 17 illustrates the components of a user portal subsystem (client service portal) 1700, which has the overall function of providing system users the ability to observe the state and health of the probes, observe probe traffic in real-time, analyze network and visualize probe traffic, view IDS alerts and view historical network captures. A remote user 1702 accesses a virtual private network (VPN) server 1704 which provides secure access to the user portal, A system health web browser 1706 which is part of the Probe Manager provides access to the state and health of the probes. Web browser 1706 accesses a web server 1708. Web server 1708 presents data for a model 1710, allows a view to be selected at 1712 or a controller interface at 1714. Probe status and health information on web server 1708 is stored in an object—relational database 1716. The remote user 1702, using the VPN server 1704, can also access a set of tools including IDS reports at 1718 which are generated by an IDS 1720. Remote user 1702 can also access via VPN server 1704 a FAN analyzer, as described below, which provides data from a data capture repository 1724 via an implementation of the SMB/CIFS networking protocol (SAMBA), and pre-probe live feeds 1726. Remote users can also access the MeshView network analysis and visualization tool.

Figure 18:
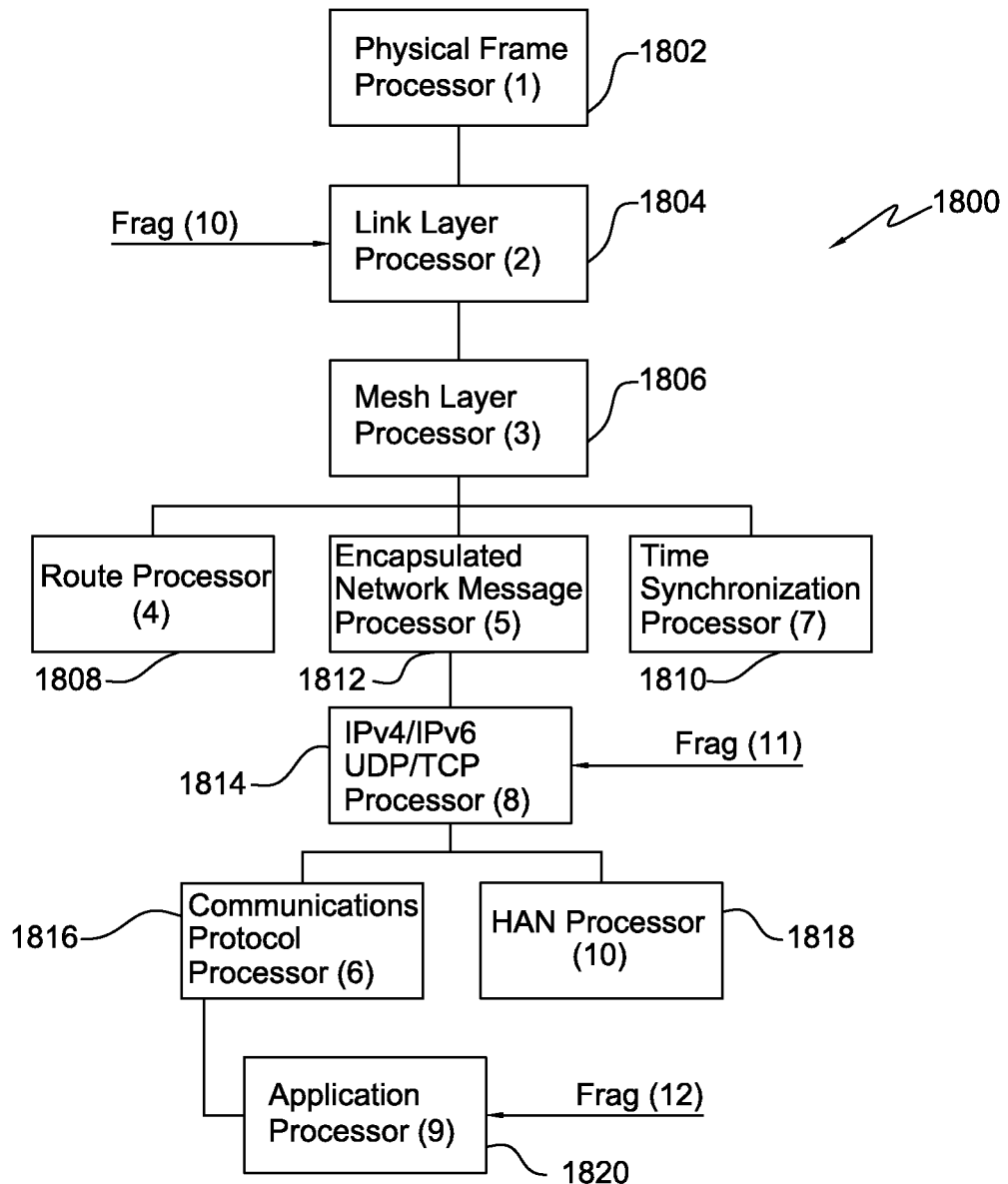
FIG. 18 is a high level block diagram of the operation of components of a FAN analyzer 218.

Referring to FIG. 18, the FAN analyzer 1800 is a software tool that interprets the bits that make up a packet and transforms them into fields of information that are more convenient for human analysis. The FAN analyzer is used for multiple purposes in the FAN intrusion detection and monitoring system. First, it is used to monitor incoming traffic in the management portion of the backend system to ensure that probes 112 are properly intercepting and transmitting packet data to the backend. Second, it is used as an application in the customer portal that enables customers to analyze intercepted traffic to solve security, operations, and engineering issues. Third, the logic used to decode packets in the FAN analyzer is used in the FAN IDS to parse incoming packets so that rules and behavior analysis can be applied.

FIG. 18 depicts a flowchart of the high-level process used to process and decode incoming packets. The knowledge required to decode packets is derived from a combination of understanding standards-based protocols and reverse engineering proprietary protocols using techniques such as searching for tag-length-value structures, recording and analysis of packets resulting from known stimulus and formulating hypothesis about information interpretation and running test scenarios to evaluate the interpretation.

Packets are decomposed from the outer edges inward, in each case removing an enveloping layer of information. At the outer most layer, the physical frame processor 1802 operates on the lowest level of information. Physical frame processing extracts the synchronization word that signals the start of a packet, the channel ID or seed value, and the frame length. If the payload of the packet is scrambled, physical frame processing may also descramble the payload in preparation for link layer processing.

The media access control and link layer processor 1804 extracts a series of information fields, typically formatted as tag-length-value, which describe link communications aspects associated with the packet passing from one node to another. Typical information extracted at the link layer includes the source and destination MAC addresses for packet, timing information required to enable nodes to synchronize with each other, especially in frequency hopping systems, timers and priority information about the communications window, packet sequence information, link layer flags and information related to the fragmentation of packets at the link layer. Additionally, low-level messages associated with the discovery of nodes, broadcasting information, testing the quality of links, and maintaining node connectivity tables are interpreted and decoded by the link layer processor.

A mesh layer processor 1806 extracts information from custom layers between the link and network layers used to route messages in non-IP mesh networks. This includes the source and destination MAC address of the communication endpoints. These addresses differ from the physical frame MAC addresses, which only identify the link source and destination, i.e. one hop in a mesh network. The mesh layer MAC addresses specify nodes that may be multiple hops apart from one another. In some cases, the exact path that a packet should take is explicitly listed as a source route.

Above the mesh layer processing, there are a number of different message transfer units. Route processor 1808 decodes packets associated with the information transferred between nodes to establish routes within the network and to configure network nodes. This includes advertisements of network gateways directly sent by gateways and indirectly reported by nodes, information about neighboring nodes, configuration information, such as IP prefixes, addresses of backend servers (e.g., DNS and Trap servers), and configurable node parameters (for example, network IDs and timers).

A time synchronization processor 1810 decodes packets related to requests and response to configure accurate time and date on each of the nodes. An encapsulated network processor 1812 extracts entire messages from the payloads that are designed to route and transmit through networks made of different technology. Typically, IPv4/IPv6 packets are completely embedded as an encapsulated packet, providing a means to transport a packet designed for one network technology over another network technology. Encapsulated network processor 1812 also extracts header information added to manage the insertion and retrieval of encapsulated packets.

An IPv4/IPv6 processor 1814 decodes standards-based protocols defined by the IETF that commonly are used over IP networks. Processor 1814 handles user datagram protocol (UDP) connectionless and Transmission Control Protocol (TCP) connection-oriented packet streams. IPv4/IPv6 packets are transport vehicles for higher layer protocols, as communication protocols that manage sessions and transactions and HAN protocols, such as, for example the IEEE Zigbee protocol standard.

A communications protocol processor 1816 interprets the messages that support request/response and application session-oriented transactions. Examples of protocols decoded in this layer include C12.22 for meter management and DNP3 for monitoring and control of supervisory control and data acquisition (SCADA) equipment. Custom communication protocols designed to operate more efficiently with the underlying network technology are also used. This is common in AMI networks, which today are mostly proprietary closed systems. The communications protocol processor 1816 also deciphers content that is wrapped with security controls, such as PKI signatures and certificates.

A HAN Processor 1818 interprets messages that are passed between backend systems and appliances in the home. The packets are carried in an embedded IP packet, extracted by a smart meter and transmitted over yet another network technology to smart appliances, thermostats and load control switches.

An application processor 1820 deciphers the highest level of information content generated by the software applications on the devices. Application layer processor 1820 decodes payload data units containing information such as meter register data, event information, and commands for remote operations, such as power disconnect/reconnect.

The FAN analyzer 1800 also contains logic to reassemble packets that may be fragmented at different layers in the network stack. Fragmentation can typically occur at the Link Layer, IPv4/IPv6 Layer, and Application Layers. Using information in headers at each layer, the FAN analyzer identifies which fragmented packets are related to one another using ID values, orders them, and reassembles their payloads so that the upper layers can process the extracted message unit. This is represented by the term "Frag", meaning a fragment, in FIG. 18.

Figure 19:
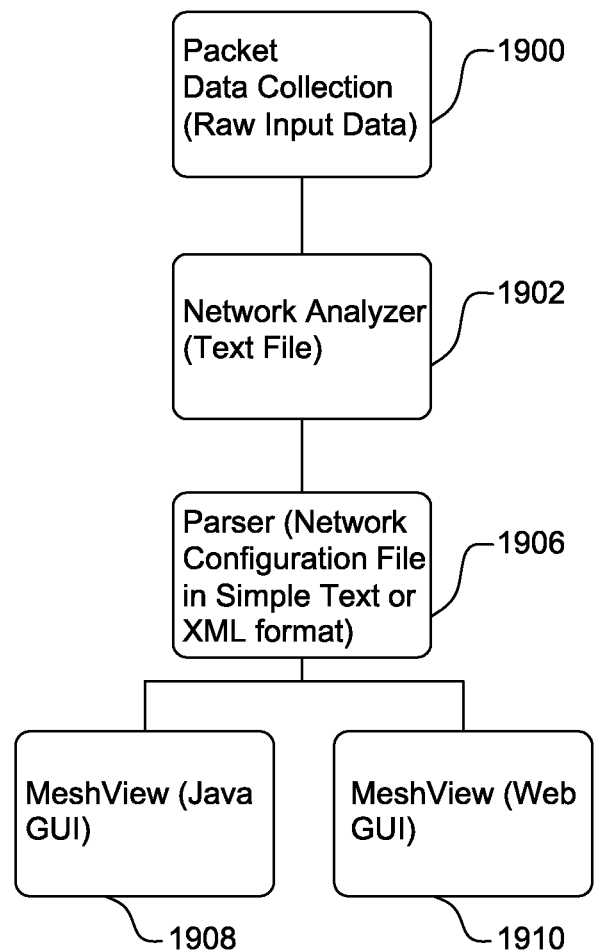
FIG. 19 is a diagram of a set of hardware and software components of a MeshView application data processing flow.

Referring to FIG. 19, one of the tools referred to in FIG. 17, is the MeshView™ application, which is a network analysis and visualization tool that abstracts information about network topology and end-to-end communications flow in FANs from the atomic communications and low level packet detail captured by a packet intercept system. A key feature of the MeshView application is that it constructs the logical and GIS-based connectivity and routing maps of FAN subnets based on traffic observations, which do not require full band capture, i.e. a sampling of channels over time in a frequency hopping system can be used to render the network topology, routing and connectivity diagrams. Another key feature of the MeshView application is the ability to apply powerful filters to the traffic observations to distill specific traffic of interest in the analysis and visualization. Yet another feature of the MeshView application is the ability to show a timeline of packet transmissions based on packet timestamp and to replay packets to observe the time sequence of the communication. The replay functionality is applied to the routing maps to observe how AP subnet routes form, change, and degrade over time in both the logical and GIS-based map views. Yet another feature of the MeshView application is to create baseline traffic statistics for each probe to establish normal operation. The MeshView application also has the ability to allow users to view the route taken by a mobile probe on a GIS-based map. The MeshView application also provides filters to allow users to select a geographic area as a filter to produce results based only on packets received, transmitted or intercepted in that area.

The MeshView application extracts information to determine network characteristics from the physical frame, link layer, mesh routing layer (a layer 2.5 protocol that is often a custom layer), a packet encapsulation layer where IPv4 or IPv6 packets are encapsulated in mesh packets, and the application layer. The physical frame provides attributes such frequency channel, and virtual network ID. The link layer provides sources and destination of direct node-to-node communication, type of packet, and timing information about where nodes will hop at a future point in time, among other info. Handshake packets that are linked in time and frequency are used to infer source and destination addresses when not present in packets. Layer 2.5 provides information on source routed packets and relaying of packets through one or more nodes to reach a destination within the mesh. Layer 2.5 also provides information about a node's chosen next hop. IP addresses in the encapsulation layer provides information on communication flows that typically cross between the mesh into backend networks beyond the access point gateway or cross nodes that have different access points. The application layer provides information about node configuration, key network server addresses, and events.

FIG. 19 shows a high level diagram of the process by which packet traces are converted into information analyzed by MeshView and presented to the application user. The traffic traces are collected and formatted in PCAP files at 1900. Text files that expose all the information elements within each packet are created from the Network Analyzer at 1902. The text files are processed by the Parser at 1906, which is written in Python in the preferred implementation. The results of the parser is a connectivity and routing information file that is imported into the MeshView database, upon which various views of network information are created and displayed to the user through the Java GUI 1908 and Web-based GUI 1910.

Figure 20:
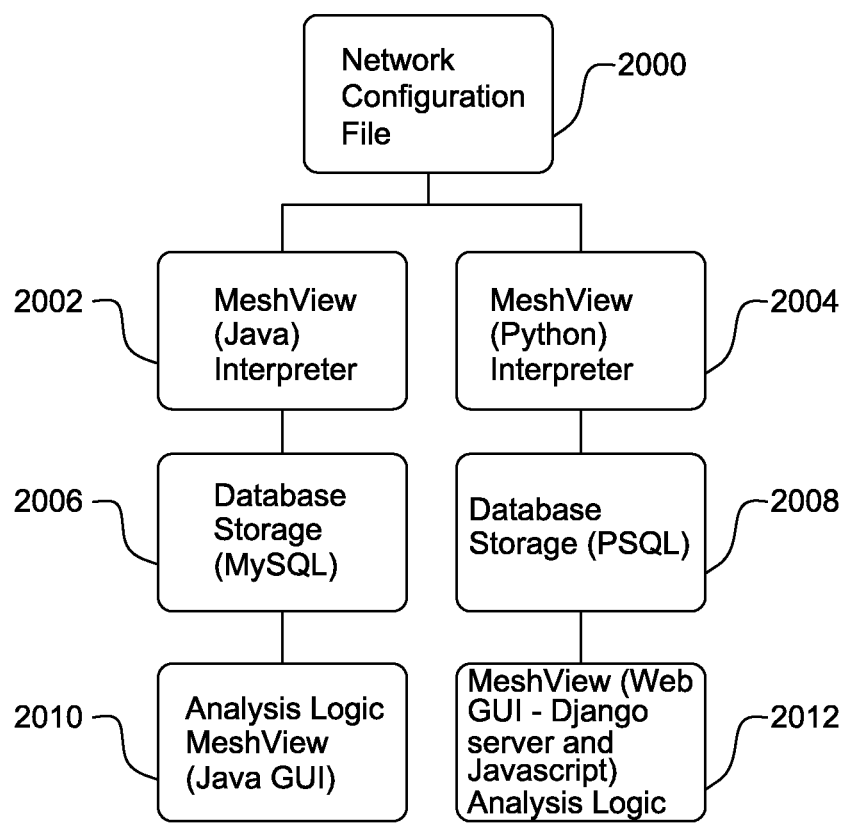
FIG. 20 is a diagram of the processing to create the network configuration data for a MeshView application data processing flow.

In FIG. 20, the MeshView application parses a network configuration file 2000 by using either a Java parser 2002 or a Python parser 2004. Data is stored in a MySQL database 2006 or a PSQL database 2008, respectively. The data is sent to Java GUI 2010 or a web GUI, such as a Django server using Javascript 2012, respectively.

Figure 21:
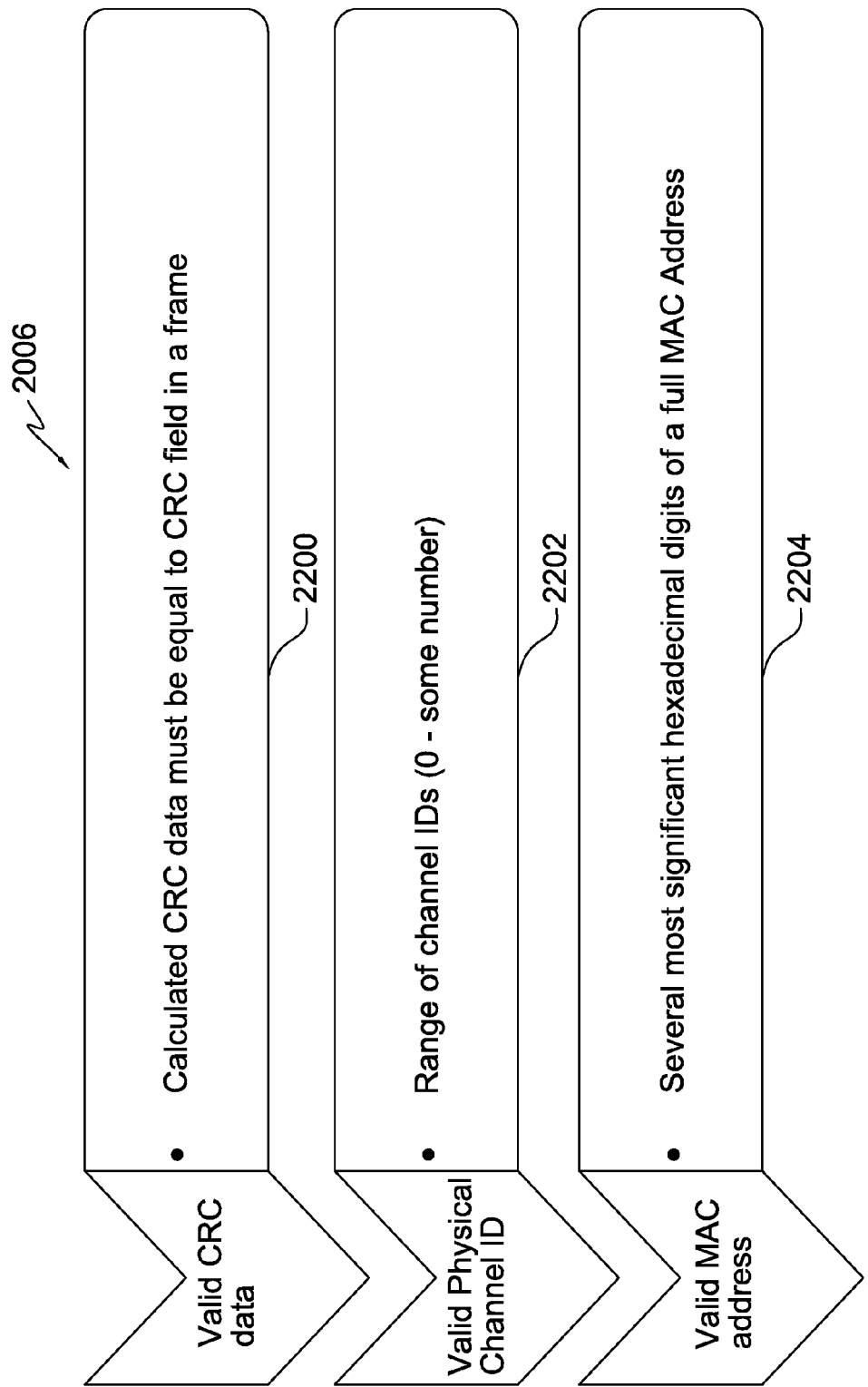
FIG. 21 is a graphical representation of a set of parser filters in the MeshView application.

In FIG. 21 some of the rules for parsing the traffic captures to valid packets and remove the normal occurrence of packet with errors are shown. Only packets with cyclic redundancy check values are accepted if the CRC in the packet matches the calculated CRC. Packets with CRC mismatches have errors and cannot be considered reliable sources of information. Additionally, only packets with, a valid physical channel ID 2202, where the range of channel IDs must be from zero to some predetermined number for the system are accepted in 2202. A Channel ID outside the expected range is an indication of a packet with error, even if the CRC is correct. Finally, only packets with valid MAC addresses, where the most significant hexadecimal digits in the MAC address match expected values are accepted in 2204. MAC addresses with unexpected values are an indicator of packet error or a possible attack.

Figure 22:
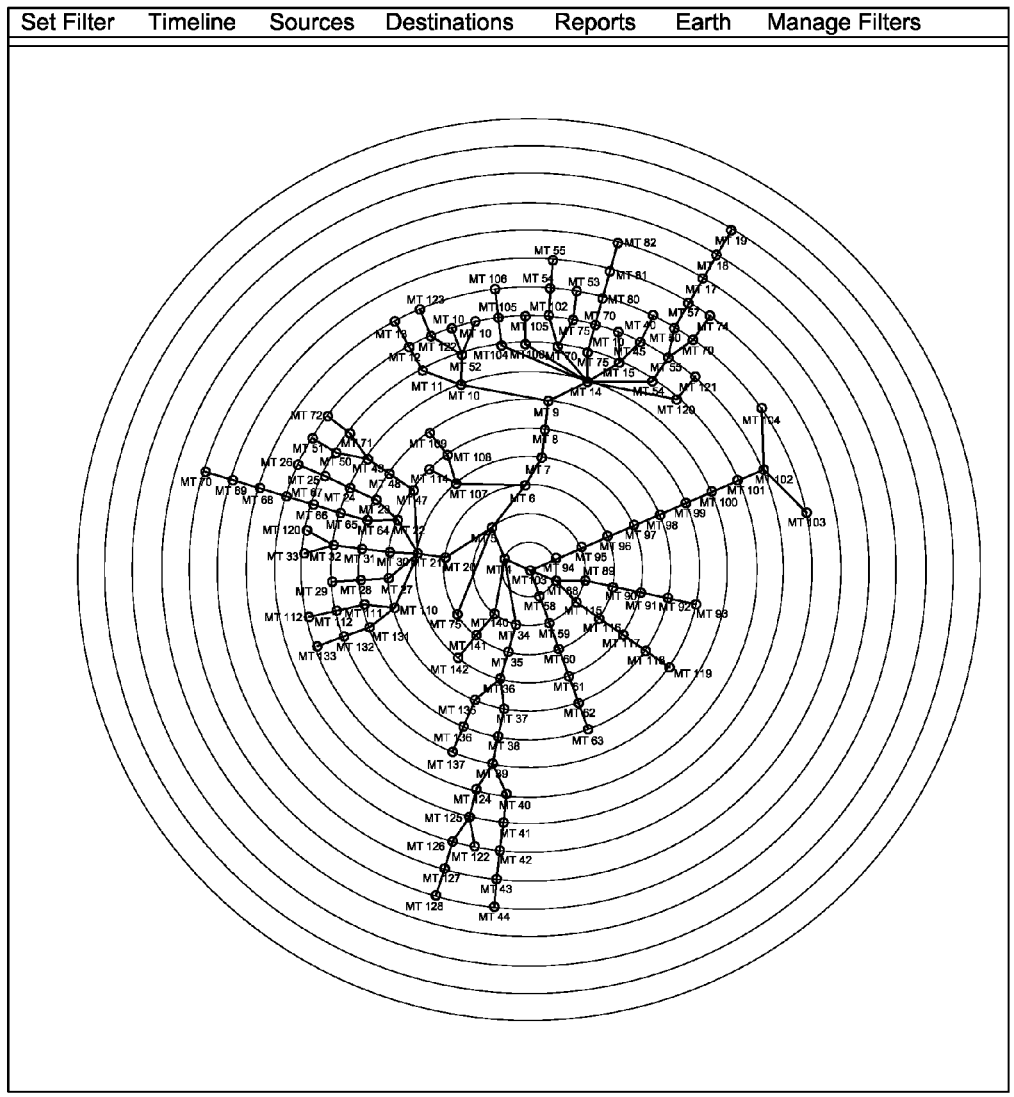
FIG. 22 is a predictive plot of nodes and interconnection of node routes in the MeshView application based on probe traffic

Referring to FIG. 22, the MeshView application constructs both logical and GIS-based connectivity and routing maps. The MeshView application constructs a predictive AP routing map by examining packets that contain source routing information (SRT) and next hop (NH) information for a node. It collects and tracks explicit routes and changes in next hop in time sequence, where a new source route with a change in next hop requires analysis to determine if it impacts any previously seen routes. When a change in next hop occurs, the predictive element of the MeshView application determines which nodes are affected (behind the node with the next hop change), and updates the route for nodes involved. The predictive AP routing map depicts the best estimate of node routes to an AP in a logical form as shown in FIG. 22.

Figure 23:
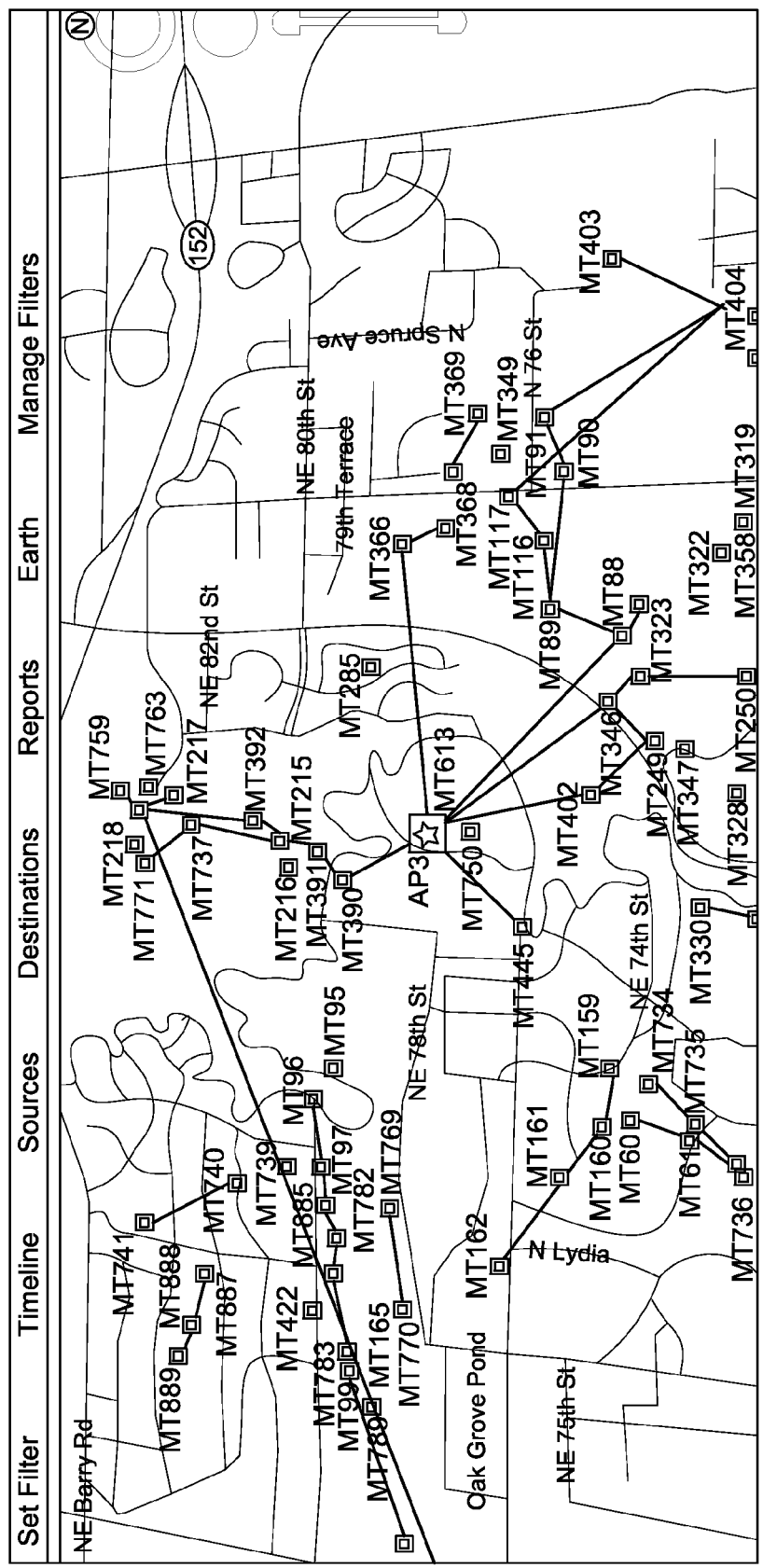
FIG. 23 is a superposition of a portion of nodes and node routes generated from the MeshView application on a terrain image.

FIG. 23 illustrates a portion of the predictive AP routing map shown in FIG. 22, with the addition of geographic coordinates for each node and interconnects of the nodes, plotted by the MeshView application, and superimposed on a Google Earth® map to provide a terrestrial view of a predictive AP routing map.

Figure 24:
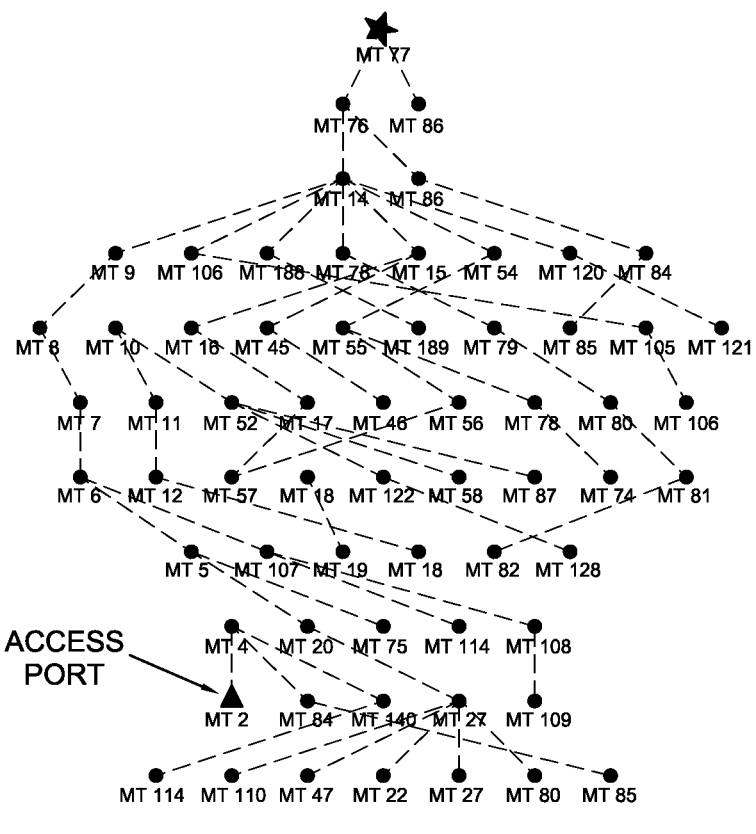
FIG. 24 is screen shot example of a connectivity map generated by the MeshView application from analyzing probe traffic.

FIG. 24 is a screen shot of a connectivity map, with multiple visualization options. The connectivity map permits the user to select a node of interest and display all communications flows for the node that satisfy the filter criteria.

If just AP routing messages are selected, the connectivity map shows a logical mesh based on just AP routes. If all messages are included, the mesh shows all communication to and from a particular node and the resulting fan-out for each node that that the node of interest had engaged through communications Additional features to improve usability especially with large mesh maps include a depth control that allows the user to control the number of hops to display (i.e. the number of rows), the ability to delete a particular node to observe the effect on the mesh (i.e. the number of nodes that are without a path to the node of interest).

Advanced filtering and time playback features enable utilities to quickly focus on data of interest and playback node activity for security analysis, forensics, network operations, network engineering, and field diagnostics. Filters are applied to information extracted from captured packets with timestamps. Key filters include time span, source nodes, destinations, node type, hop count, probe source, customer, and packet type as shown in FIG. 25.

In FIG. 25, statistics about the communications and packets resulting from the filters appears on the right-hand side. Statistics include the number of packets in the selection, the number of sources, the number destinations, hop count min, max and averages. Additionally channel statistics (not show) are extracted to show which frequency channels are used, their utilization, and the degree of uniformity in channel usage using Chi-square statistics.

The MeshView application provides a time lapse or flip book feature that enables users to playback the communications resulting from their filters. In one mode, the user selects a node of interest and observes a movie that flips through each packet that uses the nod of interest as a source, destination or relay. Users can single step through the movie one frame at a time. An important feature is that nodes involved in the playback are pre-determined and pre-positioned so that nodes remain static on the screen and do not change positions with every frame update. This helps to highlight the changes in communication paths. Persistence can be used to leave prior communications on the screen and fade those connections slowly over time.

The MeshView application also enables filter selections to be stored and later recalled to facilitate frequent access to specific slices of data.

Figure 26:
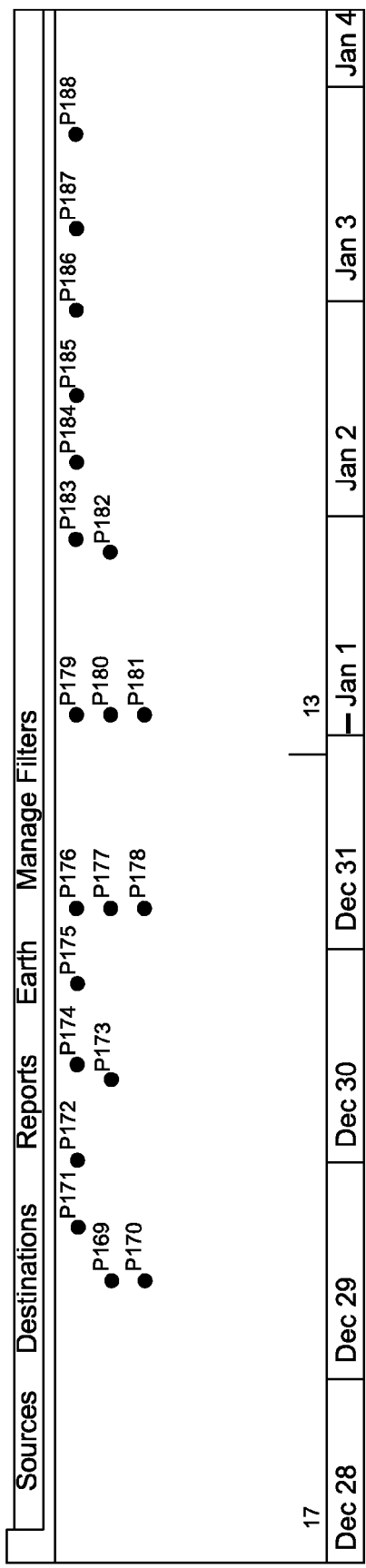
FIG. 26 illustrates a timeline view that shows the packets and communications as they appear in time in the MeshView application.

FIG. 26 illustrates a timeline view that shows the packets and communications as they appear in time to easily identify clustering of communications.

The MeshView Web system is comprised of hardware and software components. The hardware components are general purpose server-class computing devices with solid-state hard drives and substantial memory. The software is a combination of open-source frameworks and custom software that performs the specific functionality of the system.

Figure 27:
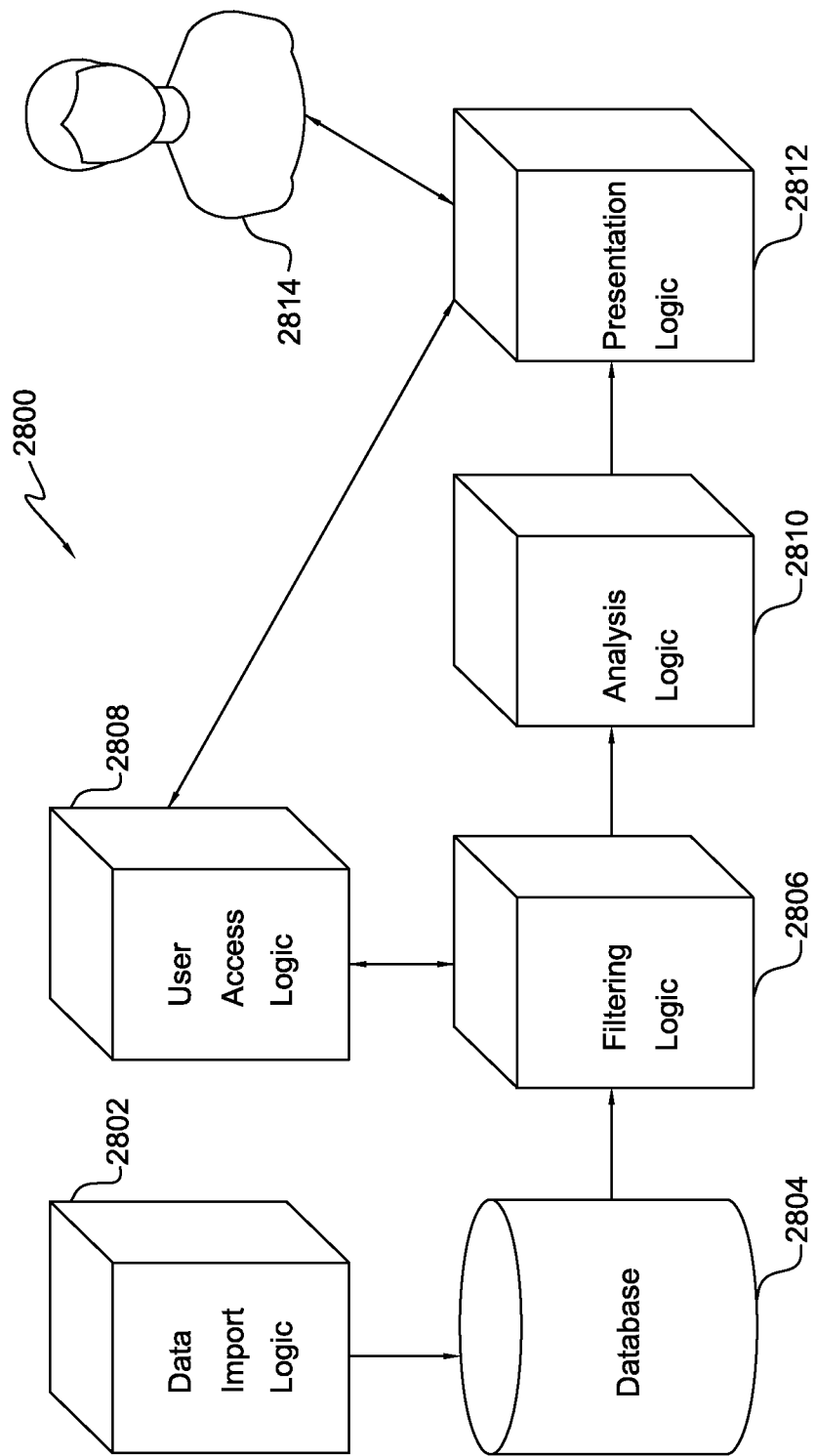
FIG. 27 is a logical block diagram of the components for the MeshView application.

In FIG. 27, the logical block diagram of the components for the mesh view system 2800 is illustrated. Data import logic 2802 is used to import network data from the network configuration file 2100 to a database 2804. Filtering logic 2806 filters the data in accordance with the filters configured by user access logic 2808. Analysis logic 2810 is used to sort and analyze the data. Presentation logic 2812 provides the GUIs that the user 2814 can use to interact with the system, including settings in the user logic 2808.

Open source components include the following:
the Python programming language
the Django web framework
the Postgres database with PostGIS extensions
the Django-tables2 display component
the networkX graphing analysis package from Los Alamos National Laboratory
graphical javascript libraries from thejit.org
the nginx web server with gunicorn worker processes
miscellaneous javascript libraries such as async.js and ready.js
the Scipy statistical analysis package
the Google Earth web plugin and framework
Custom software includes:
Methods to import and normalize probe data into the database;
Methods to create, customize, save, and manage filters that restrict data analysis to a subset of packets, based on selected devices, packet types, probes, timeframes, and other characteristics;
Near real-time updates of statistics related to the filtered data;
Creation and visualization of traffic and communications among devices, to include static and dynamic visualization using time-based playback in both abstract and geospatial domains;
Statistical analysis of communications networks, to include detection of nonuniform use of transmission frequencies, abnormal graph characteristics, and other indications of anomalous device or network behavior;
Methods to associate individual system users to a set of data for which they are authorized; and
Logic to optimize performance of the system To import and normalize probe data into the database, custom code receives data regarding network communications in a specific format and ensures its completeness. It then normalizes the data, performs analysis on select fields, and writes them to a database.

To create, customize, save, and manage filters that restrict data analysis to a subset of packets, based on selected devices, packet types, probes, timeframes, and other characteristics, user input is received via a series of web-based forms and constructs filters representing the user selection of packet characteristics. The filters are then used to limit the dataset for further analysis by the system. The user has the option of saving, modifying, adding, loading, or removing filters. The filters can be unique to the user account.

The system can provide dynamic, near real-time updates of statistics relating to the filtered data. These statistics include number of devices in the selection, number of packets, types of data, and other data derived from the selected data such as radio frequency channel statistics and assessments of uniformity.

Filtered network data is used to create static and dynamic graphical visualizations of communications flows, traffic and characteristics, including predictive time-based visualizations using time-based playback of occurrences in network mesh formation. These visualizations are both abstract (using traditional graph and mesh layout) and geospatial, where appropriate, with accurate overlays onto geospatial software, such as, for example, Google Earth, as described above with respect to FIG. 24.

Statistical analysis of filtered data in the communications network is used to detect interesting or anomalous characteristics of the network communication. An example of such analysis is the distribution analysis of radio-frequency communication channels which will detect non-random use of specific communications channels. This is an indication of an operational or security problem. A further example includes detection of non-uniform use of transmission frequencies, abnormal graph characteristics, and other indications of anomalous device or network behavior.

The overall system described herein has many advantages. The system can implement a robust user authentication and data access model that restricts data based on sets of permissions inherited from multiple sources. This ensures that a user only has access to data to which his organization or employer has access and that access has been explicitly granted.

The system may include logic for optimization using methods that enhancer speed of analysis and ease-of-use. The data models used are designed to facilitate rapid acquisition and analysis of communications and statistical data related to the data inputs.

The system architecture has been described in two parts. The low-level packet processing part extracts key information from a selection of packets, tracks a list of nodes and node-related information, and creates an output file that is passed to the higher-layer analysis and visualization. The low-level packet processing part has also been described in the attached figures. The higher layer analysis and visualization architecture also has been shown.

Benefits of the system design and approach disclosed herein include:
Standards based architecture that provides a consistent approach to functionality and presentation and aids in development, maintenance, and support.
The database is optimized for efficiency and speed tailored to the specific type of content being analyzed (network traffic with geolocation information).
Visualizations provide clear, easy-to-understand analytic results that would require pages of text to describe.
Time-based playback provides historical views of data as well as predictive views of future system behavior.
The web-based system provides scalability, security, and distribution to the client base while retaining centralization of maintenance functions.
Detailed statistical analysis allows for anomaly detection far beyond existing solutions, using proven techniques to determine probabilities related to characteristics of data.

A significant aspect of the system disclosed herein, is the use of probes that are separate and distinct from the AMI and DA system they monitor. A system of probes, collectors and management tools as disclosed herein is custom built to work with non-IP AMI and DA FANs, many of which use mesh networking and frequency hopping technology. In addition, the present system implements analysis on custom protocols, knowledge of which can be acquired through reverse engineering efforts. A further distinction is that when monitoring WiFi networks for intrusion detection, commercial implementations monitor the backend of the router, as opposed to over-the-air traffic, as in the present disclosure. Yet another distinction is the node tracking capability and channel scanning and sampling techniques used by the probes.

The system and method disclosed herein can be commercialized as services for solution development, i.e., developing and integrating a custom solution for a utility, managed services where an entity deploys and manages the system on behalf of a utility, or produced as a product that can be sold to utilities or through partnerships with FAN/AMI network providers, as white label products.

It will be understood that the disclosure may be embodied in a computer readable non-transitory storage medium storing instructions of a computer program which when executed by a computer system results in performance of steps of the method described herein. Such storage media may include any of those mentioned in the description above.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves.

The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

What is claimed is:

1. A method for monitoring a field area network, the method comprising:
    backhauling, by a packet intercept system on a field area network, to at least one additional network, a traffic data stream intercepted by the packet intercept system from the field area network,
        wherein the field area network comprises a plurality of network nodes,
        wherein the packet intercept system is comprised of a plurality of probes interspersed along the network nodes of the field area network,
        wherein the at least one additional network is distinct from the field area network, and
        wherein the traffic data stream comprises at least one of: individual packets, packet detail or metadata generated by at least one probe of the plurality of probes, based on processing at least one intercepted packet from the field area network;
    processing, by a processor communicatively coupled to the at least one additional network, the traffic data stream, to create a processed live traffic data stream; and
    obtaining, by the processor, the processed live traffic data stream, and analyzing the processed live traffic data stream in real-time, wherein the analyzing comprises applying behavior analytics to the processed live traffic data stream.

2. The method of claim 1, the analyzing further comprising at least one of identifying anomalies, identifying intrusions, identifying events, or validating configurations.

3. The method of claim 1, wherein the processing of the traffic data stream comprises one or more of: decrypting, decompressing, or descrambling bits in the traffic data stream, and wherein the additional network comprises at least one of: a wireless network, a utility tier 1 network, a utility tier 2 network, a broadband connection, or a logical channel.

4. The method of claim 1, wherein the processing of the traffic data stream further comprises:
    extracting, by the processor, connectivity and routing information from the traffic data stream, wherein the connectivity and routing information comprises packet information and node information.

5. The method of claim 1, wherein the plurality of probes intercept one of: a selection of a pre-determined number of channels, or a full spectrum of channels.

6. The method of claim 1, wherein the plurality of probes intercept designated channels in the field area network over a pre-defined time interval.

7. The method of claim 1, wherein the plurality of probes comprise one or more of: a probe with a fixed location, or a mobile probe.

8. The method of claim 1, wherein the traffic data from the packet intercept system comprises a physical frame, a link layer, a mesh routing layer, a packet encapsulation layer, and an application layer, and wherein the extracting comprises extracting temporal information, connectivity information, node information, configuration information, customer information, and routing information from at least one of the group consisting of: the physical frame, the link layer, the mesh routing layer, the packet encapsulation layer, or the application layer.

9. The method of claim 1, wherein the behavior analytics comprise a set of rules.

10. The method of claim 9, wherein the analyzing comprises identifying events, further comprising: generating, by the processor, an alert, when an identified event satisfies the set of rules.

11. The method of claim 1, wherein applying behavior analytics comprises applying a separate set of rules to each layer of a stack.

12. The method of claim 1, further comprising creating packet trace files, where the creating comprises: adding metadata to the traffic stream, moving the traffic stream with the added metadata through a secure transport stream to a second processor, utilizing the second processor to create packet trace files from the traffic stream with the added metadata.

13. The method of claim 9, wherein rules in the set of rules are at least one of: global, region specific, probe specific, fixed, dynamic, node specific, or protocol-specific.

14. The method of claim 1, wherein the analyzing the processed live traffic data stream further comprises extracting protocol data units embedded in packets in the live traffic data stream.

15. The method of claim 1, wherein the analyzing the processed live traffic data stream further comprises analyzing packet data in the live traffic data stream, the packet data comprising at least one of: physical frame, media access control, link layers, custom layers, or embedded levels of application layer protocol.

16. The method of claim 1, wherein the analyzing the processed live traffic data stream further comprises analyzing proprietary protocols on the field area network.

17. A computer system for monitoring a field area network, the computer system comprising:
    a memory; and
    a processor in communications with the memory, wherein the computer system is configured to perform a method, said method comprising:
        obtaining, by the processor, on a first network via a packet intercept system on a second network intercepting and backhauling to the first network, a traffic data stream from the second network, the traffic data stream,
  wherein the second network is a field area network comprising a plurality of network nodes,
  wherein the packet intercept system is comprised of a plurality of probes interspersed along the network nodes of the field area network,
  wherein the first network is distinct from the second network, and
  wherein the traffic data stream comprises at least one of: individual packets, packet detail or metadata generated by at least one probe of the plurality of probes, based on processing at least one intercepted packet from the second network;
processing, by the processor, the traffic data stream, to create a processed live traffic data stream; and
obtaining, by the processor, the processed live traffic data stream, and analyzing the processed live traffic data stream in real-time, wherein the analyzing comprises applying behavior analytics to the processed live traffic data stream.

18. The computer system of claim 17, the analyzing further comprising at least one of identifying anomalies, identifying intrusions, identifying events, or validating configurations.

19. The computer system of claim 17, wherein the processing the traffic data stream comprises one or more of: decrypting, decompressing, or descrambling bits in the traffic data stream.

20. The computer system of claim 17, wherein the processing the traffic data stream further comprises:
  extracting, by the processor, connectivity and routing information from the traffic data stream, wherein the connectivity and routing information comprises packet information and node information.

21. The computer system of claim 17, wherein the plurality of probes intercept one of: a selection of a pre-determined number of channels, or a full spectrum of channels.

22. The computer system of claim 17, wherein the plurality of probes comprise one or more of: a probe with a fixed location, a mobile probe.

23. The computer system of claim 17, wherein the behavior analytics comprise a set of rules.

24. The computer system of claim 23, wherein the analyzing comprises identifying events, further comprising: generating, by the processor, an alert, when an identified event satisfies the set of rules.

25. The computer system of claim 17, wherein applying behavior analytics comprises applying a separate set of rules to each layer of a stack.

26. The computer system of claim 17, wherein the obtaining of the processed live traffic data stream is through a virtual network kernel.

27. The computer system of claim 23, wherein rules in the set of rules are at least one of: global, region specific, probe specific, fixed, dynamic, node specific, or protocol-specific.

28. The computer system of claim 17, wherein the analyzing the processed live traffic data stream further comprises extracting protocol data units embedded in packets in the live traffic data stream.

29. The computer system of claim 17, wherein the analyzing the processed live traffic data stream further comprises analyzing packet data in the live traffic data stream, the packet data comprising at least one of: physical frame, media access control, link layers, custom layers, or embedded levels of application layer protocol.

30. The computer system of claim 17, wherein the analyzing the processed live traffic data stream further comprises analyzing proprietary protocols on the field area network.

31. The computer system of claim 17, wherein the plurality of probes intercept designated channels in the field area network over a pre-defined time interval, and wherein the first network comprises at least one of: a wireless network, a utility tier 1 network, a utility tier 2 network, a broadband connection, or a logical channel.

32. A computer program product for monitoring a field area network, the computer program product comprising:
  a non-transitory computer readable storage medium readable by a processing circuit and storing instructions for execution by the processing circuit for performing a method comprising:
    obtaining, by the processor, on a first network via a packet intercept system on a second network intercepting and backhauling to the first network, a traffic data stream from the second network,
      wherein the second network is a field area network comprising a plurality of network nodes,
      wherein the packet intercept system is comprised of a plurality of probes interspersed along the network nodes of the field area network,
      wherein the first network is distinct from the second network, and
      wherein the traffic data stream comprises at least one of: individual packets, packet detail or metadata generated by at least one probe of the plurality of probes, based on processing at least one intercepted packet from the second network;
    processing, by the processor, the traffic data stream, to create a processed live traffic data stream; and
    obtaining, by the processor, the processed live traffic data stream, and analyzing the processed live traffic data stream in real-time, wherein the analyzing comprises applying behavior analytics to the processed live traffic data stream.

33. The computer program product of claim 32, the analyzing further comprising at least one of identifying anomalies, identifying intrusions, identifying events, or validating configurations.

34. The computer program product of claim 32, wherein the processing of the traffic data stream comprises one or more of: decrypting, decompressing, or descrambling bits in the traffic data stream, and wherein the first network comprises at least one of: a wireless network, a utility tier 1 network, a utility tier 2 network, a broadband connection, or a logical channel.

35. The computer program product of claim 32, wherein the processing of the traffic data stream further comprises:
  extracting, by the processor, connectivity and routing information from the traffic data, wherein the connectivity and routing information comprises packet information and node information.

36. The computer program product of claim 32, wherein the plurality of probes intercept one of: a selection of a pre-determined number of channels, or a full spectrum of channels.

37. The computer program product of claim 32, wherein the plurality of probes comprise one or more of: a probe with a fixed location, a mobile probe.

38. The computer program product of claim 32, wherein the behavior analytics comprise a set of rules.

* * * * *